US012570472B2

(12) United States Patent　　(10) Patent No.: US 12,570,472 B2

Ikawa et al.　　(45) Date of Patent: Mar. 10, 2026

(54) REPLENISHMENT ASSISTANCE ROBOT AND REPLENISHMENT ASSISTANCE SYSTEM

(71) Applicant: DAIO PAPER CORPORATION, Ehime (JP)

(72) Inventors: Taro Ikawa, Ehime (JP); Takuro Shimada, Kagawa (JP); Masato Onishi, Ehime (JP)

(73) Assignee: DAIO PAPER CORPORATION, Ehime (JP)

( * ) Notice: Subject to any disclaimer, the term of this patent is extended or adjusted under 35 U.S.C. 154(b) by 693 days.

(21) Appl. No.: 17/997,282

(22) PCT Filed: Jul. 8, 2021

(86) PCT No.: PCT/JP2021/025843

§ 371 (c)(1),
(2) Date: Oct. 27, 2022

(87) PCT Pub. No.: WO2022/044561

PCT Pub. Date: Mar. 3, 2022

(65) Prior Publication Data

US 2023/0174303 A1　　Jun. 8, 2023

(30) Foreign Application Priority Data

Aug. 27, 2020　(JP) ................................. 2020-143906

(51) Int. Cl.
B65G 1/137　　(2006.01)
G06K 7/10　　(2006.01)
G06Q 10/087　　(2023.01)

(52) U.S. Cl.
CPC ......... B65G 1/1371 (2013.01); B65G 1/1375 (2013.01); G06K 7/10356 (2013.01);
(Continued)

(58) Field of Classification Search
CPC ............ B65G 1/1371; B65G 2203/046; B65G 2209/06; B65G 1/1375; G06K 7/10366;
(Continued)

(56) References Cited

U.S. PATENT DOCUMENTS

2009/0322486 A1* 12/2009 Gerstel ................ B65G 1/1371
340/10.1
2012/0019364 A1　1/2012 Reichenbach et al.
(Continued)

FOREIGN PATENT DOCUMENTS

CN　　101585443　　11/2009
CN　　101719213　　6/2010
(Continued)

OTHER PUBLICATIONS

JP-2015110481-A (Year: 2015).*
(Continued)

*Primary Examiner* — Ernesto A Suarez
*Assistant Examiner* — Laurence R Brothers
(74) *Attorney, Agent, or Firm* — IPUSA, PLLC

(57) ABSTRACT

It is possible to provide a replenishment assistance robot and a replenishment assisting system capable of assisting a worker in efficiently replenishing a product. A replenishment assistance robot includes a housing for housing a product, an RFID reader including an antenna capable of reading RFID tags attached to the product on a shelf and capable of reading an RFID tag of the product when the product is housed in the housing, a terminal configured to receive a replenishment instruction of a product on the shelf, and a mobile body containing the housing and the RFID reader and configured to move to a location where a stock of the product is arranged based on location information of the product included in the replenishment instruction.

10 Claims, 14 Drawing Sheets

(52) U.S. Cl.
CPC ..... *G06K 7/10366* (2013.01); *G06K 7/10376* (2013.01); *G06Q 10/087* (2013.01); *B65G 2203/046* (2013.01); *B65G 2209/06* (2013.01)

(58) Field of Classification Search
CPC .......... G06K 7/10376; G06K 7/10356; G06Q 10/087
See application file for complete search history.

(56) References Cited

U.S. PATENT DOCUMENTS

| | | | |
|---|---|---|---|
| 2018/0053147 A1* | 2/2018 | Zhang | G06Q 10/087 |
| 2018/0186003 A1* | 7/2018 | Chen | B25J 11/008 |
| 2019/0062056 A1* | 2/2019 | Kurimoto | G06Q 10/08 |
| 2019/0287051 A1* | 9/2019 | Heinla | G06Q 10/083 |
| 2019/0389659 A1* | 12/2019 | Grinnell | G06Q 10/087 |
| 2020/0223632 A1* | 7/2020 | Melanson | B60P 3/00 |
| 2021/0276802 A1 | 9/2021 | Yoshinaga | |

FOREIGN PATENT DOCUMENTS

| | | |
|---|---|---|
| CN | 204688918 U | 10/2015 |
| CN | 110626701 | 12/2019 |
| EP | 2899145 | 7/2015 |
| JP | H07-15622 U | 3/1995 |
| JP | H11-236107 | 8/1999 |
| JP | 2000-128319 | 5/2000 |
| JP | 2003-292125 | 10/2003 |
| JP | 2007-015775 | 1/2007 |
| JP | 2008-302988 | 12/2008 |
| JP | 2015-110481 | 6/2015 |
| JP | 2015110481 A * | 6/2015 |
| JP | 2016-004289 | 1/2016 |
| JP | 2019-112231 | 7/2019 |
| KR | 10-2015-0121276 | 10/2015 |
| WO | 2019/236040 | 12/2019 |
| WO | WO-2019236040 A2 * | 12/2019 ............ G06Q 30/06 |
| WO | 2020/004059 | 1/2020 |

OTHER PUBLICATIONS

International Search Report for PCT/JP2021/025843 mailed on Sep. 28, 2021.
Taiwanese Office Action for 110128849 mailed on Nov. 13, 2024.
Office Action dated Mar. 28, 2023 issued with respect to the basic Japanese Patent Application No. 2020-143906.
Extended European Search Report for 21860991.5 mailed on Feb. 14, 2024.
Chinese Office Action for 202180032334.5 mailed on Jun. 4, 2025 with machine translation.

* cited by examiner

FORWARD

START REPLENISHMENT PROCESS

PERFORM MAP CREATION PROCESS — S11

TRANSMIT REPLENISHMENT INSTRUCTION — S12

TRANSMIT ID INFORMATION — S13

PERFORM COUNTING PROCESS OF REPLENISHMENT NUMBER — S14

TRANSMIT REPLENISHMENT STATUS — S15

S16

NO     REPLENISHMENT COMPLETED?

YES

S17

NO     ALL REPLENISHMENT COMPLETED?

YES

TRANSMIT COMPLETION INFORMATION — S18

END REPLENISHMENT PROCESS

FIG.12

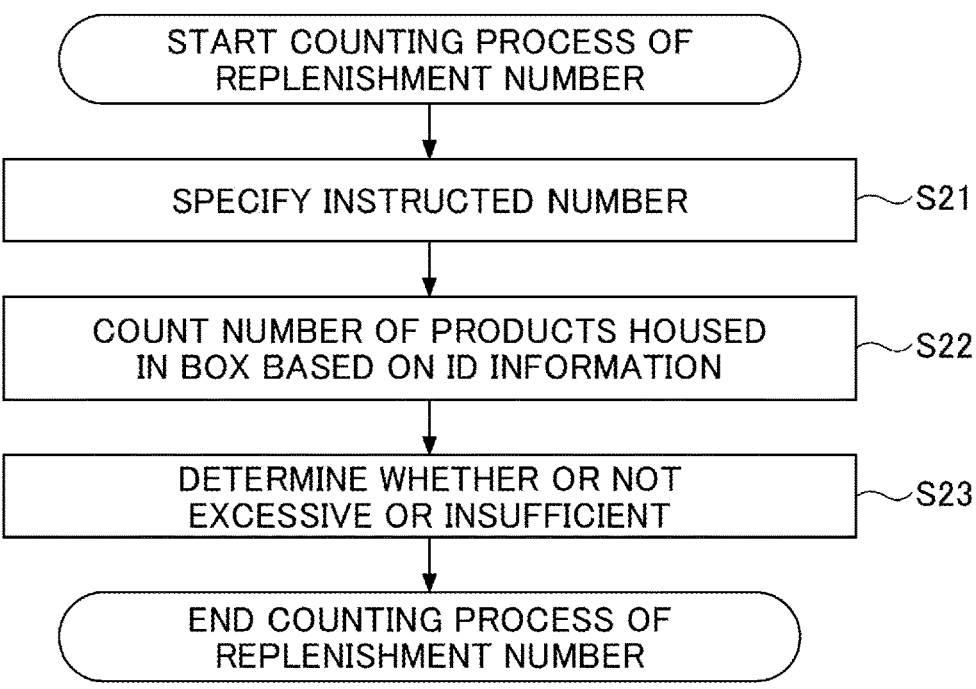

START COUNTING PROCESS OF
REPLENISHMENT NUMBER

SPECIFY INSTRUCTED NUMBER — S21

COUNT NUMBER OF PRODUCTS HOUSED
IN BOX BASED ON ID INFORMATION — S22

DETERMINE WHETHER OR NOT
EXCESSIVE OR INSUFFICIENT — S23

END COUNTING PROCESS OF
REPLENISHMENT NUMBER

FIG.13

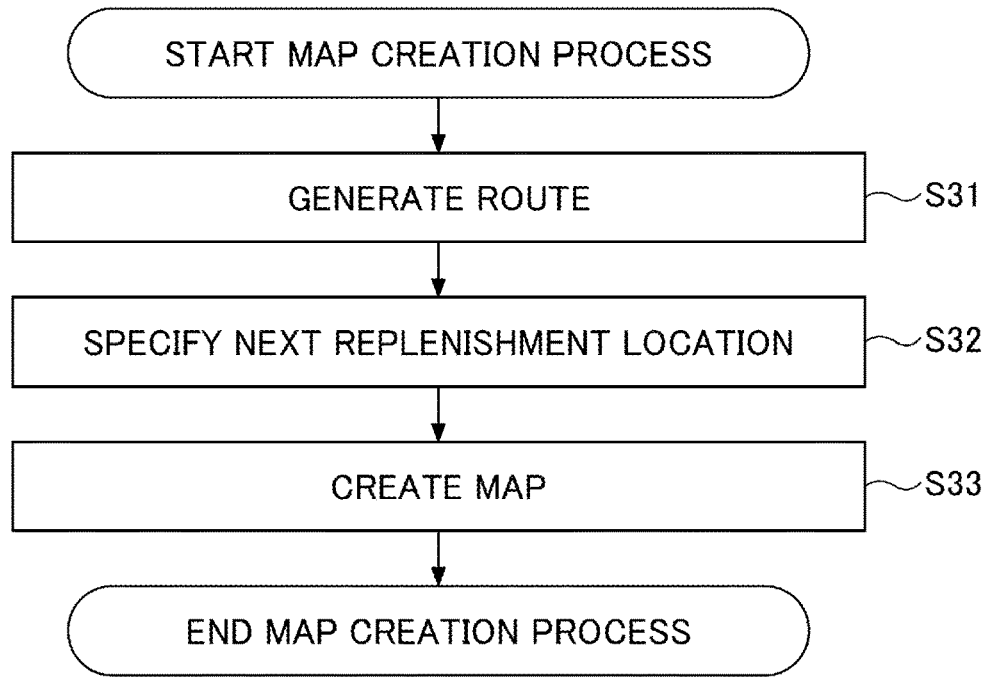

START MAP CREATION PROCESS

GENERATE ROUTE — S31

SPECIFY NEXT REPLENISHMENT LOCATION — S32

CREATE MAP — S33

END MAP CREATION PROCESS

REPLENISHMENT ASSISTANCE ROBOT AND REPLENISHMENT ASSISTANCE SYSTEM

TECHNICAL FIELD

The present disclosure relates to a replenishment assistance robot and a replenishment assistance system.

BACKGROUND ART

Conventionally, when shipping products are stored in a distribution center or the like according to an order, a replenishment operation in which a person selects and takes out the products to be shipped from among the products in the distribution center or the like is known. For example, Patent Document 1 discloses that a worker looks at a replenishment order displayed on a display provided on a replenishment trolley for replenishing.

RELATED-ART DOCUMENTS

Patent Documents

Patent Document 1: Japanese Unexamined Utility Model Application Publication No. 1995-15622

However, since the conventional replenishment trolleys are not self-propelled, the replenishment trolleys are required to be moved by the worker to the place where the work is desired to be performed. Therefore, when such replenishment trolleys are used for the replenishment of products such as an inventory of articles, the replenishment trolleys are required to be moved by the worker to the place where the replenishment work is desired to be performed. Therefore, the worker cannot efficiently perform the replenishment work.

SUMMARY OF THE INVENTION

Problem to be Solved by the Invention

Accordingly, it is an object of one embodiment of the present disclosure to provide a replenishment assistance robot and a replenishment assistance system capable of assisting a worker in efficiently replenishing products.

Means to Solve the Problem

<Clause 1> A replenishment assistance robot according to one aspect of an embodiment of the present disclosure includes a housing for housing a product, an RFID reader including an antenna capable of reading RFID tags attached to the product on a shelf and capable of reading an RFID tag of the product when the product is housed in the housing, a terminal configured to receive a replenishment instruction of a product on the shelf, and a mobile body containing the housing and the RFID reader and configured to move to a location where a stock of the product is arranged based on location information of the product included in the replenishment instruction.

According to this aspect, the worker can concentrate on an operation for housing a stock into the housing (an inventory operation) because the product is moved to a location where a stock of the product included in the replenishment instruction is arranged. Thus, it is possible to provide a replenishment assistance robot capable of assisting the worker in efficiently replenishing products.

<Clause 2> In the replenishment assistance robot according to Clause 1, wherein the terminal, upon recognizing that the RFID tag is read by the RFID reader when the product is housed in the housing, may output a response tone indicating that the RFID tag is recognized or may display a response indication indicating that the RFID tag is recognized.

According to this aspect, the worker can check that the RFID tag has been read by the RFID reader by means of a response tone or a response indicator, and can proceed to the next step, resulting in improved work efficiency.

<Clause 3> The replenishment assistance robot according to Clause 2 may further include an authenticator that performs an authentication of a worker when the terminal recognizes that the RFID tag is read by the RFID reader when the product is housed in the housing.

According to this aspect, because the worker who put the product into the housing can be identified, the work amount and the work efficiency of the worker can be grasped.

<Clause 4> In the replenishment assistance robot according to any one of Clauses 1 to 3, the mobile body may wait without moving until an operation representing a completion of work with respect to the terminal is performed by a worker, after the RFID tag is read by the RFID reader when the product is housed in the housing.

According to this aspect, the replenishment assistance robot does not move until the worker has completed the operation, but can move when the worker has completed the operation. Therefore, the work can be improved by moving the picking assistance robot 100 according to the worker's intention.

<Clause 5> In the replenishment assistance robot according to any one of Clauses 1 to 4, the mobile body may move to a location, based on location information included in a moving instruction, when an operation representing a completion of work with respect to the terminal is performed by a worker after the RFID tag is read by the RFID reader when the product is housed in the housing.

According to this aspect, because the replenishment assistance robot can be moved when the worker has completed the operation, the work efficiency can be improved by moving the picking assistance robot 100 according to the worker's intention.

<Clause 6> In the replenishment assistance robot according to Clause 5, the moving instruction is an instruction to move from a first location where an operation for putting the product into the housing is performed to a second location where an operation of taking out the product housed in the housing is performed, and wherein the mobile body moves to the second location based on location information included in the moving instruction.

According to this aspect, because the replenishment assistance robot can be moved to the second location where an operation of taking out the product housed in the housing is performed upon completion of the operation by the worker, the work efficiency can be improved by moving the replenishment assistance robot 100 according to the worker's intention.

<Clause 7> In the replenishment assistance robot according to Clause 6, the second location is a location where the shelf is located, and the shelf is a display shelf.

According to this aspect, the replenishment assistance robot can be moved to the second location where the shelf is located when the worker has completed the operation. Accordingly, if the worker removes the product and places the product on the shelf at the second location, the work of replenishing the product on the shelf can be efficiently performed.

<Clause 8> In the replenishment assistance robot according to any one of Clauses 1 to 7, the RFID reader including the antenna includes a first antenna provided on a front or a side of the mobile body and capable of reading the RFID tag attached to the product on the shelf, and a second antenna disposed at a position capable of reading the RFID tag when the product is housed in the housing.

According to this aspect, because the product housed in the housing is taken out and then movement is to the location of the product included in another picking instruction, the picking assistance can be continuously performed and the work efficiency can be improved.

<Clause 9> In the replenishment assistance robot according to any one of Clauses 1 to 8, the antenna may be provided at an inlet of the housing.

According to this aspect, because the RFID tag attached to the product can be read reliably at the inlet of the housing, the probability of not being able to read the RFID tag can be reduced and the work efficiency can be improved by improving the reading accuracy.

<Clause 10> In the replenishment assistance robot according to Clause 9, the inlet of the housing may be located above the housing, and the antenna may be provided above the inlet.

According to this aspect, because the RFID tag attached to the product can be read more reliably at the antenna above the inlet of the housing, the probability of not being able to read the RFID tag can be further reduced and the work efficiency can be further improved by further improving the reading accuracy.

<Clause 11> In the replenishment assistance robot according to any one of Clauses 8 to 10, the housing is provided as a plurality of housings, the antenna is provided in each of the plurality of housings as a plurality of antennas, and the picking assistance robot further includes a shield between the plurality of housings such that regions capable of being read by the plurality of antennas are not overlapped.

According to this aspect, duplicate reading can be prevented between multiple housings, and multiple housings that can house more products can be used to significantly improve the work efficiency.

<Clause 12> The replenishment assistance robot according to any one of Clauses 1 to 11, further includes an alarm generator for emitting an alarm, wherein the terminal causes the alarm generator to emit an alarm when the mobile body moves to a location where a stock of the product is arranged.

According to this aspect, since an alarm is emitted when the product is moved to the position where the stock of the product is arranged, the worker can be notified that the replenishment assistance robot has moved to the position where the stock of the product is arranged. Thus, the worker can recognize that inventory operation is required. Therefore, the inventory operation can be performed efficiently.

<Clause 13> In a replenishment assistance system that includes a server and the replenishment assistance robot as claimed in any one of Clauses 1 to 11, the replenishment assistance system according to one aspect of an embodiment of the present disclosure includes a picking instruction management unit configured to transmit a picking instruction, an ID information receiving unit configured to receive ID information written on an RFID tag attached to a product read by an RFID reader, a count unit configured to count a number of products housed in a housing based on the ID information, and a picking status management unit configured to transmit a picking status based on the number of the counted products.

According to this aspect, the worker can concentrate on the picking operation of the product because the product is moved to the shelf on which the product included in the picking instruction is arranged. Thus, it is possible to provide a picking assistance system including a picking assistance robot capable of assisting the worker in efficiently picking products.

<Clause 14> In the replenishment assistance system according to Clause 13, the count unit determines whether or not the number housed in the housing is excessive or insufficient with respect to an insufficient number at the shelf calculated based on the replenishment instruction, and the replenishment status management unit displays on a terminal one message, from among the following: a product is insufficient, replenishment is completed, and a product is excessive.

According to this aspect, the worker can easily distinguish between a product being insufficient, the picking being completed, and a product being excessive.

Effects of the Invention

According to an embodiment of the present disclosure, a replenishment assistance robot and a replenishment system can be provided to enable the worker to replenish products efficiently.

BRIEF DESCRIPTION OF THE DRAWINGS

FIG. 12 is a flowchart of a replenishment number counting process (S14 in FIG. 11);

FIG. 13 is a flowchart of a map creation process of an embodiment (S11 in FIG. 11);

MODE FOR CARRYING OUT THE INVENTION

Hereinafter, embodiments of a replenishment assistance robot and the replenishment assistance system of the present disclosure will be described.

Figure 1:
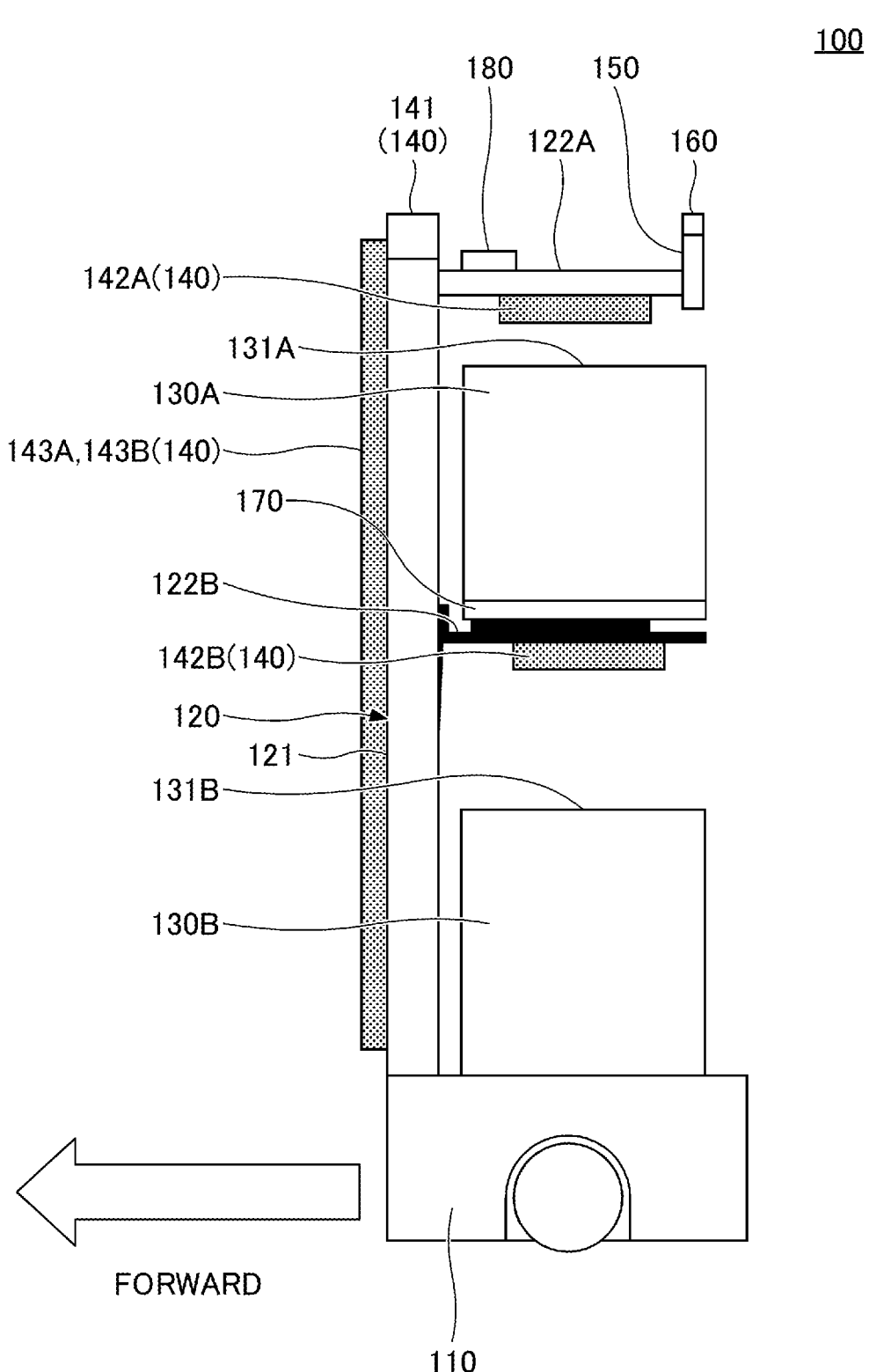
FIG. 1 is a side view illustrating a replenishment assistance robot 100 of an embodiment.

FIG. 1 is a side view illustrating a replenishment assistance robot 100 of an embodiment. The replenishment assistance robot 100 includes a conveyor vehicle 110, a frame 120, boxes 130A and 130B, a Radio Frequency Identifier (RFID) reader 140, a tablet computer 150, a face authenticator 160, a shield 170, and an alarm generator 180.

As an example, the replenishment assistance robot 100 is used in a building such as a shop, a distribution center, or a warehouse, and is a robot (apparatus) that assists a worker in replenishment of a product while automatically traveling as a self-propelled conveyor vehicle 110. The replenishment work of the product is, for example, a work of replenishing inventory items stored in a backyard of a store. The replenishment assistance robot 100 is thus a robot that assists in replenishing the products stored in a first location (for example, the backyard) to a second location (for example, a shelf of the sales area). In this case, the replenishment assistance robot 100 may detect a product that has become small in number at the sales area of the store and move to in front of the shelf on which the product in stock in the backyard of the store is arranged. Further, when products are periodically received in the backyard, the replenishment assistance robot 100 may move to the backyard of the store according to the time of receiving.

The left side indicated by an arrow in FIG. 1 is a front side of the replenishment assistance robot 100 and the right side in FIG. 1 is a rear side of the replenishment assistance robot 100. Hereinafter, the front and rear directions in the traveling direction of the replenishment assistance robot 100 will be referred to as a front-rear direction. The conveyor vehicle 110 can travel forward, right front, and left front.

Herein, the product may be various products or the like arranged on shelves or the like in a building, such as a store, a distribution center, a warehouse or the like, and may be various products or the like, such as clothes and daily necessities. Further, the product may also be a drug such as a swallowing drug, an injection drug, or an external therapeutic drug, a mask, or other medical clothing or equipment.

The conveyor vehicle 110 is an example of a mobile body and is realized by a so-called Automatic Guided Vehicle (AGV) as an example. The conveyor vehicle 110 includes a controller composed of a computer. The controller of the conveyor vehicle 110 can perform data communication with the tablet computer 150 via wired or wireless communication. The controller of the conveyor vehicle 110 moves the conveyor vehicle 110 to a predetermined location represented by location information transmitted from the tablet computer 150 according to an electronic map created for a path or the like between shelves or the like disposed in the building. The controller of the conveyor vehicle 110 transmits an arrival notification indicating arrival at the predetermined location to the tablet computer 150 upon completion of movement to the predetermined location represented by the location information. Hereinafter, a mode in which the conveyor vehicle 110 moves using the location information included in a replenishment instruction received from the management server by the tablet computer 150 will be described. However, the conveyor vehicle 110 may include a wireless communication function that enables direct wireless communication with the management server, and the location information may be obtained directly from the management server by wireless communication.

The frame 120 is mounted on the conveyor vehicle 110 and holds the boxes 130A and 130B, the RFID reader 140, the tablet computer 150, and the face authenticator 160. The frame 120 has a frame body 121 and stays 122A and 122B. The frame body 121 is, for example, an aluminum rod-shaped member, and iron stays 122A and 122B are attached as an example. Antennas 143A and 143B of the RFID reader 140 are attached to a front surface of the frame body 121.

The stay 122A is attached to the upper end of the frame body 121 and extends to the rear. The stay 122A holds a main body 141 and an antenna 142A of the RFID reader 140, the tablet computer 150, the face authenticator 160, and the alarm generator 180. More specifically, the main body 141 of the RFID reader 140 is attached to the top surface of the front end of the stay 122A, the antenna 142 is attached to the bottom surface of the center in the front-rear direction of the stay 122A, and the tablet computer 150 and face authenticator 160 are attached to the rear end of the stay 122A. The tablet computer 150 and the face authenticator 160 are attached toward the rear. This is to ensure the safety of workers using the replenishment assistance robot 100 because the replenishment assistance robot 100 does not travel backward. If the safety of the workers can be ensured with certainty, the replenishment assistance robot 100 may travel backward automatically or manually.

The stay 122B is attached in proximity to the middle of the frame body 121 in a vertical direction. Therefore, the stay 122B is located below the stay 122A. The box 130A is attached to the upper surface of the stay 122B and an antenna 142B of the RFID reader 140 is attached to the lower surface of the stay 122B.

The boxes 130A and 130B are an example of a housing, and houses a product taken out from the shelf or the like, by the worker, at the first location such as a backyard. The boxes 130A and 130B are, by way of example, rectangular boxes including inlets 131A and 131B having an open top surface. The inlets 131A and 131B are where the product always passes when the product is put into the boxes 130A and 130B. Here, a mode in which the worker takes out a product from the boxes 130A and 130B through the inlets 131A and 131B will be described. Therefore, the inlets 131A and 131B are the openings used as the inlets and outlets. However, the boxes 130A and 130B may have a dedicated outlet that is used only for ejection.

The box 130A is attached to the top surface of the stay 122B as described above, and the box 130B is attached to the top surface of the conveyor vehicle 110. The box 130A is located in the upper row and the box 130B is located in the lower row. Here, a mode in which the box 130A is attached to the frame body 121 via the stay 122A and the box 130B is attached to the upper surface of the conveyor vehicle 110 will be described. However, the box 130A is only required to be located above the box 130B, and the boxes 130A and 130B may be attached in any form. Further, although the mode in which the replenishment assistance robot 100 includes two boxes 130A and 130B is described here, the number of boxes may be one, three, or more.

Figure 2:
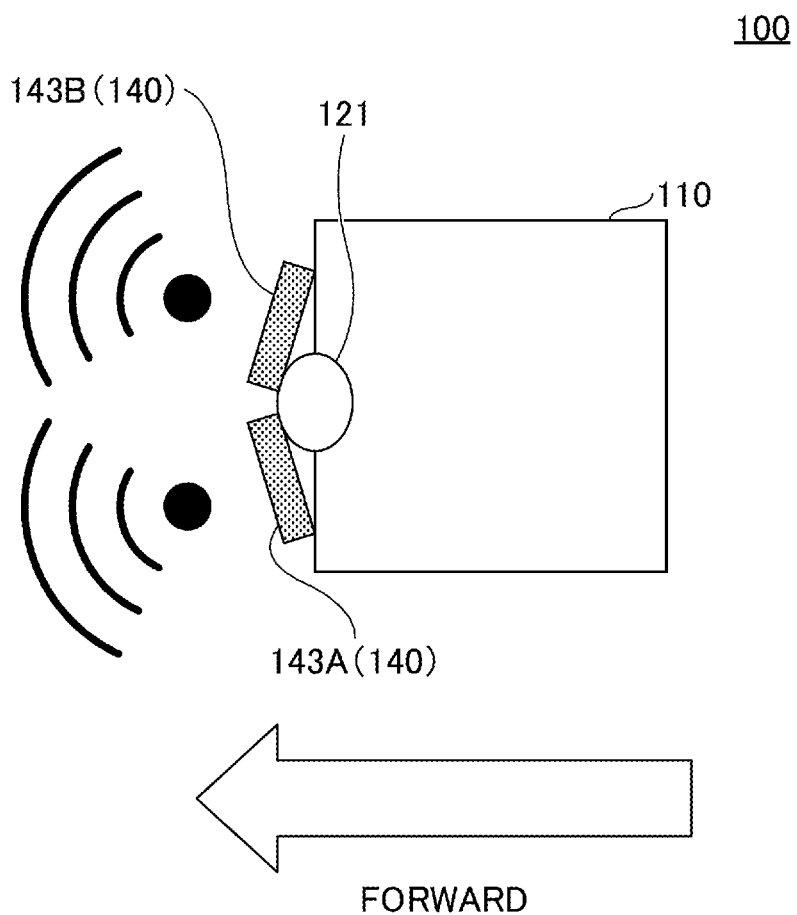
FIG. 2 is a plan view schematically illustrating the replenishment assistance robot 100 of an embodiment.

The RFID reader 140 has a main body 141, antennas 142A and 142B, and the antennas 143A and 143B. The antennas 142A and 142B are examples of a second antenna, and the antennas 143A and 143B are examples of a first antenna. Here, antennas 143A and 143B will be described with reference to FIG. 2 in addition to FIG. 1. FIG. 2 is a plan view schematically illustrating the replenishment assistance robot 100 of the embodiment. FIG. 2 illustrates the position of the conveyor vehicle 110, the frame body 121 of the frame 120, and antennas 143A and 143B in a plan view.

The body 141 can select one of the antennas 142A and 142B and the antennas 143A and 143B to read the RFID tags.

The antennas 143A and 143B are attached to the front side of the frame body 121 and have forward directivity. The antennas 143A and 143B are provided to read, by the replenishment assistance robot 100, an RFID tag attached to the product arranged on the shelf or the like at the first location, such as a backyard, to identify the type and number of the products, as well as to identify the type and number of the products whose number has decreased at the second location, such as a sales area of the store.

It should be noted that the antennas 143A and 143B are not necessarily attached to the front side of the frame body 121 and have a forward directivity. For example, the antennas 143A and 143B may be attached to the side of the frame body 121 and have lateral directivity. However, if the antennas 143A and 143B are attached to the front side of the frame body 121 and are configured to have a forward directivity, the directionality of the antennas 143A and 143B will be the same as the direction in which the replenishment assistance robot 100 travels. Therefore, after the replenishment assistance robot 100 reads the RFID tag attached to the product arranged on the shelf or the like at the first location, such as a backyard, or at the second location, such as the sales area, the replenishment assistance robot 100 can approach the product more quickly to improve the work efficiency.

The antennas 142A and 142B have downward directivity. The main body 141 is connected to the antennas 142A and 142B and radiates radio waves from the antennas 142A and 142B at a frequency for reading an RFID tag and receives radio waves sent back by the RFID tag. The RFID tag, for example, is passive and does not include a battery. A unique product identifier (ID) is stored in a memory of an Integrated Circuit (IC) of each RFID tag. When each RFID tag receives radio waves from the RFID reader 140, the RFID tag is activated by the power of the received radio waves and radiates a signal including the unique product ID. The main body 141 reads the product ID included in the radio waves received by the antennas 142A and 142B and identifies each RFID tag.

The antenna 142A is located directly above the inlet 131A of the box 130A and is disposed at a position where the RFID tag attached to the product housed in the box 130A through the inlet 131A can be reliably read. The antenna 142B is located directly above the inlet 131B of the box 130B and is disposed at a position where the RFID tag attached to the product housed in the box 130B through the inlet 131B can be reliably read. By disposing the antennas 142A and 142B in this manner, the RFID tag attached to the products to be taken out from the shelf or the like at the first location, such as the backyard, and housed in the boxes 130A and 130B can be reliably read by the worker, and thus reading omission (read-out) can be prevented. The replenishment assistance robot 100 containing the products in the boxes 130A and 130B moves to the second location, such as the sales area, and moves to a shelf for displaying the products. The worker can take out the products from the boxes 130A and 130B and replenish the products on the shelf. Therefore, a desired product can be correctly replenished by a desired number.

Further, for example, when a barcode is attached to the product and read by a barcode reader, the barcode is read one by one, and multiple barcodes cannot be read simultaneously. On the other hand, when the RFID tag is attached to the product, multiple RFID tags can be read simultaneously. Therefore, the multiple RFID tags attached to the multiple products can be collectively read by each of the antennas 142A and 142B. Accordingly, the worker can efficiently and quickly perform the replenishment operation in a short time.

Further, when the product has a metal package such as an aluminum film, reading radio waves radiated by the antennas 142A and 142B are blocked by the metal package of the product already housed in the boxes 130A and 130B. In this case, if the antennas 142A and 142B are provided below the boxes 130A and 130B, there is a possibility that the RFID tag of the product passing through the inlets 131A and 131B of the boxes 130A and 130B cannot be read. Further, when the product contains a liquid, a radiation distribution of the reading radio waves radiated by the antennas 142A and 142B changes due to the liquid of the product already housed in the boxes 130A and 130B. In this case, if the antennas 142A and 142B are provided below the boxes 130A and 130B, there is a possibility that the RFID tag of the product passing through the inlets 131A and 131B of the boxes 130A and 130B cannot be read.

On the other hand, in the present embodiment, the antennas 142A and 142B are located directly above the boxes 130A and 130B, respectively, so that the RFID tag of the product being put into the boxes 130A and 130B through the inlets 131A and 131B can be reliably read, even if the product has a metal package or the product contains a liquid. Further, an occurrence of the reading omission can be prevented.

Here, a mode in which the RFID reader 140 includes the antennas 142A and 142B and the antennas 143A and 143B is described. However, the antenna for reading the product on the shelf or the like at the first location, such as the backyard, or at the second location, such as the sales area, and the antenna for reading the product through inlets 131A and 131B of the boxes 130A and 130B may be common. For example, in the case where the replenishment assistance robot 100 includes only one box 130A, an antenna for reading the product on the shelf or the like at the first location and an antenna for reading the product through the inlet 131A of the box 130A may be configured by a single common antenna.

The tablet computer 150 includes a display and a touch panel. The tablet computer 150 is a terminal that is operable by touching an image, such as a Graphic User Interface (GUI) displayed on the display. The tablet computer 150 receives the replenishment instruction and a replenishment status from the management server to display on the display and to transmit location information of the product included in the replenishment instruction to the controller of the conveyor vehicle 110. For example, the tablet computer 150 may use application software to display the replenishment instruction and to transmit the location information to the controller of the conveyor vehicle 110.

Further, the tablet computer 150 receives, from the RFID reader 140, product ID information read from the RFID tag by the RFID reader 140 with the antennas 142A and 142B. The tablet computer 150 transmits the product ID information received from the RFID reader 140 to the management server. Further, the tablet computer 150 transmits information for identifying the worker obtained by the face authenticator 160 to the management server in association with the product ID information read from the RFID tag attached to the product housed in the boxes 130A and 130B. This is to grasp the work efficiency of each worker by enabling the management server to manage which worker has housed which product.

Although a mode in which the replenishment assistance robot 100 includes the tablet computer 150 is described here, any computer terminal such as a smartphone or a laptop personal computer may be used.

The face authenticator 160 obtains worker ID information for identifying the worker by performing the face authentication of the worker. As an example, a mode in which the replenishment assistance robot 100 includes the face authenticator 160 for grasping the work efficiency of each worker by the management server is described. However, instead of the face authenticator 160, an authenticator that identifies a body part of the worker by other methods may be used, or a reading device for reading an ID card or the like assigned to each worker may be used. Further, when the work efficiency or the like is not specifically managed, the replenishment assistance robot 100 is not required to include an authenticator for identifying a worker such as a face authenticator 160 or the like. Further, for example, even when only the replenishment assistance robot is touched, the information for identifying the worker obtained by the face authenticator 160 may be managed at the server, without being associated with the product ID information read from the RFID tag attached to the product housed in the boxes 130A and 130B.

A shield 170 is a conductor material that shields radio waves. The shield 170 is provided between the box 130A and the antenna 142B to prevent the antenna 142A from reading the RFID tag attached to the product housed in the box 130B. When the antenna 142B also has an upward directionality, the shield 170 may shield the antenna 142B so as not to read the RFID tag located on the upper side.

The alarm generator 180 is mounted to the step 122A of the frame 120 and is positioned next to the face authenticator 160. The alarm generator 180 emits an alarm sound upon receiving a notification indicating that it has moved to the first location, such as a backyard from the controller of the conveyor vehicle 110. For example, if the worker is basically in the second location such as the sales area of the store or the like, when the alarm sound is emitted, the worker can grasp that the replenishment assistance robot 100 is working in the backyard. Therefore, the worker can move from the sales area to the backyard and take out the product in stock from the shelf or the like. For example, if a salesclerk takes out the product from the backyard in the case of there being no worker assigned to the backyard of the store, it is possible to minimize the time for the salesclerk to leave the store and improve the work efficiency when the store is viewed as a whole. Further, since it is not necessary to deploy a dedicated worker in the backyard, it is possible to reduce the number of employees working in the store and to operate the store efficiently, thereby greatly reducing labor costs. Further, if the replenishment assistance robot 100 is set to go to the backyard at a time when the number of visitors is small or at night, the replenishment work can be performed more efficiently.

<System Configuration>

Figure 3:
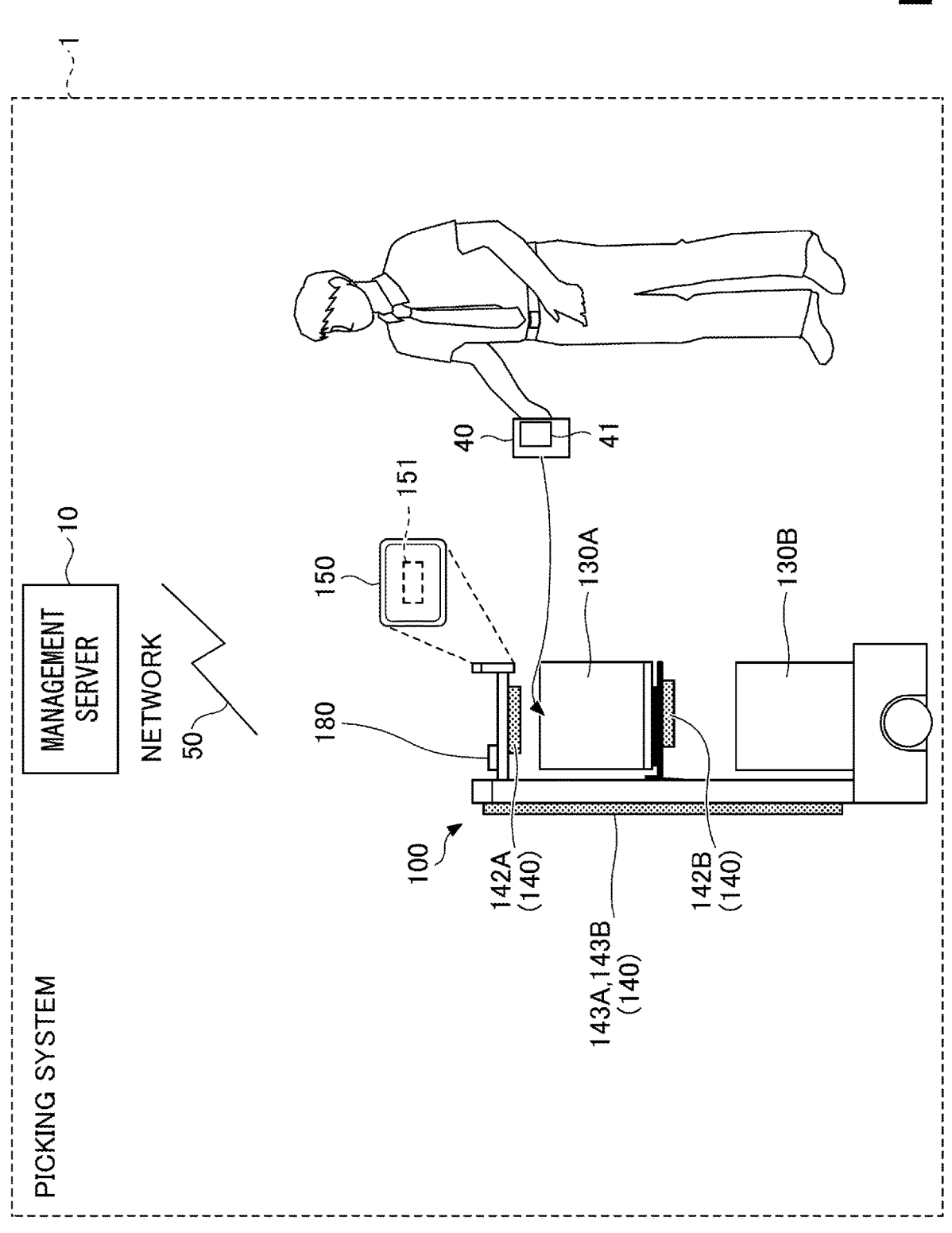
FIG. 3 is a schematic view of an entire configuration of a replenishment assistance system 1 according to an embodiment.

FIG. 3 is a schematic view of an entire configuration of a replenishment assistance system 1 according to an embodiment. As illustrated in FIG. 3, the replenishment assistance system 1 includes the management server 10 and the replenishment assistance robot 100. FIG. 3 illustrates a controller 151 of the tablet computer 150. The controller 151 performs entire controls of the operation of the tablet computer 150 and includes a central processing unit (CPU) and a memory.

As an example, a worker who performs a replenishment operation works under the following assumptions. As a premise, the replenishment assistance robot 100 reads the type and the number of the products 40 on the shelf with the antennas 143A and 143B of the RFID reader 140 at the second location, such as the sales area of the store or the like, and identifies a product whose number has decreased. Then, the replenishment assistance robot 100 moves to the first location, such as the backyard, where the product 40 is in stock, to read the type and the number of the products 40 stored in stock with the antennas 143A and 143B of the RFID reader 140. Then, the replenishment assistance robot 100 moves in front of the shelf or the like on which the product 40 to be replenished is arranged, displays the type and the number of products 40 to be acquired on the display, and waits. The worker who performs the replenishment operation checks the type and the required number of the products 40 on the display of the tablet computer 150, and puts the product 40 arranged on the shelf or the like in front of the replenishment assistance robot 100 into the box 130A or the box 130B. Since each product 40 is provided with one RFID tag 41, when the product 40 is being put into the boxes 130A and 130B, a product ID of the RFID tag 41 attached to the product 40 is read by the antennas 142A and 142B. When the putting the product 40 into the box 130A or the box 130B is completed, the replenishment assistance robot 100 moves and waits in front of the shelf on which the product 40 is displayed at the second location such as the sales area. The worker (staff) may take out the product from the boxes 130A and 130B and display the product on a shelf accessible to customers at the sales area.

Here, as an example, the replenishment assistance robot 100 reads the type and the number of the products 40 on the shelf with the antennas 143A and 143B of the RFID reader 140 at the second location, such as the sales area of the store or the like, and identifies the product in which the number is small. However, the replenishment assistance robot 100 may be configured to periodically acquire a fixed number of the products from the stock, instead of identifying the product of which the number is small by reading the type and the number of the products 40 on the shelf with the antennas 143A and 143B of the RFID reader 140.

The management server 10 transmits a replenishment instruction to the tablet computer 150. The replenishment instructions may include information on the location where the replenishment assistance robot 100 is to move, the product 40 to be put into the box 130A or the box 130B by the worker, and the type and number of each product 40 arranged on the display shelf. The location where the replenishment assistance robot 100 is to move is the location at which the product 40 is arranged or stored. The management server 10 transmits a replenishment status to the tablet computer 150. The replenishment status may include information related to the number of products 40 already in the box 130A or the box 130B. Specifically, the management server 10 counts the number of products 40 in the box 130A or the box 130B based on the product ID information read from the RFID tag 41 by the RFID reader 140 through the antennas 142A and 142B.

The management server 10 is comprised of one or more computers. The management server 10 may transmit and receive data to and from the tablet computer 150 via any network 50. Details of the management server 10 will be described below.

The tablet computer 150 receives the replenishment instruction and the replenishment status from the management server 10, displays the replenishment instruction and the replenishment status on the display, and transmits the location information included in the replenishment instruction to the controller of the conveyor vehicle 110. The conveyor vehicle 110 moves to a location represented by the location information. For example, the tablet computer 150 may use application software to display the replenishment instruction and to transmit the location information included in the replenishment instruction to the controller of the conveyor vehicle 110. The worker walks to the location where the replenishment assistance robot 100 is located, checks the type of the product 40, the location of the shelf, or the like displayed on the tablet computer 150, and picks the product 40 to put into the boxes 130A and 130B.

The RFID reader 140 reads the product ID information written to the RFID tag 41. The RFID reader 140 transmits the product ID information read from the RFID tag 41 to the tablet computer 150.

Further, the tablet computer 150 receives the product ID information read through the antennas 142A, 142B, 143A, and 143B from the RFID reader 140. The tablet computer 150 transmits the product ID information received from the RFID reader 140 to the management server 10. Further, the tablet computer 150 receives the product ID information and outputs a response sound indicating that the product 40 is a correct product 40 upon determining the product 40 to be the correct product 40 according to the replenishment instruction. On the other hand, the tablet computer 150 receives the product ID information and outputs a response sound indicating that the product 40 is not the correct product 40 if the tablet computer determines that the product 40 is not the correct product 40 according to the replenishment instruction. The worker can check whether the replenishment operation he/she is performing is correct by the response sound. Note that the tablet computer 150 may display, instead of or in addition to the response sound, a response indication representing whether the product is the correct product 40 or is not the correct product 40.

The replenishment assistance robot 100 includes the tablet computer 150 and the RFID reader 140. Here, an example in which the replenishment assistance robot 100 includes two boxes 130A and 130B, the RFID reader 140 includes the antennas 142A and 142B and the antennas 143A and 143B, and the antennas 142A and 142B are disposed in the boxes 130A and 130B, respectively, will be described. The worker may put the picked product 40 into either of the two boxes 130A and 130B. For example, the worker may put the replenished product into either of the two boxes 130A and 130B depending on the shipping destination or the like. Further, when there are two shipping destinations or the like, the two boxes 130A and 130B may be used separately for the two shipping destinations.

As described above, the product 40 is various products or the like arranged on shelves or the like in a building, such as a store, a distribution center, a warehouse, or the like. The RFID tag 41 is attached to the product 40. The RFID tag 41 includes an IC chip that includes a memory in which the product ID information is written. One RFID tag 41 is attached to each product 40. Attaching the RFID tag 41 to the product 40 means attaching the RFID tag 41 to the product 40, e.g., the RFID tag 41 is attached to the product 40, sewn, or fixed with a strap or the like.

When the product 40 arrives at the distribution center or the like, the management server 10 manages the product ID information written on the RFID tag 41 and the information of the product 40 to which the RFID tag 41 is attached in association with each other. Further, the management server 10 manages information indicating which of the boxes 130A and 130B of the replenishment assistance robot 100 is the box housing the RFID reader 140.

<Entire Process>

Figure 4:
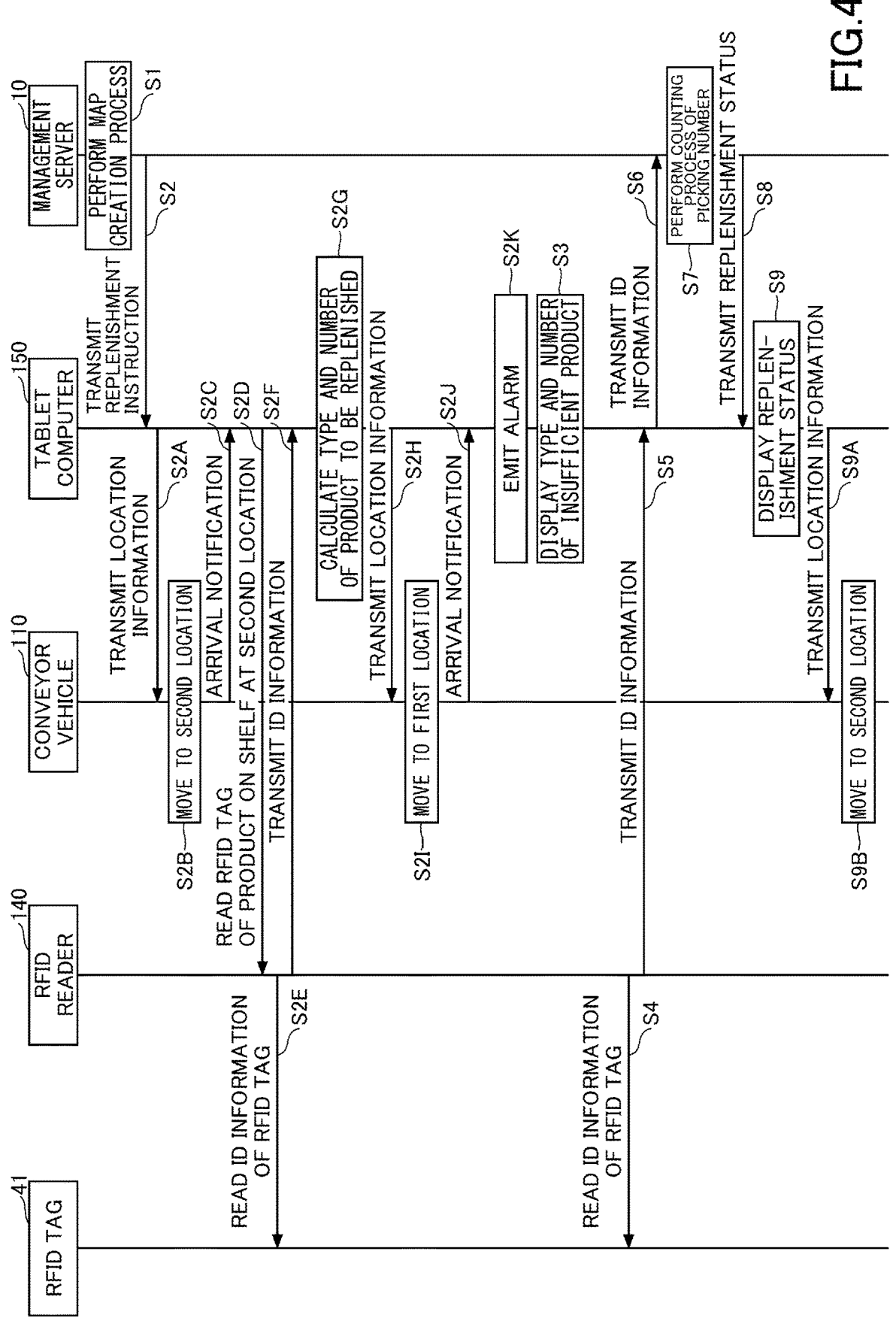
FIG. 4 is a sequence diagram illustrating an entire process of the replenishment assistance system 1 according to an embodiment.

FIG. 4 is a sequence diagram illustrating the entire process of the replenishment assistance system 1 of the embodiment.

The management server 10 creates a map for guiding the replenishment assistance robot 100 (step S1).

The management server 10 transmits data of the replenishment instruction to the tablet computer 150 (step S2). As described above, the replenishment instructions may include information on the location where the replenishment assistance robot 100 is to move (the location at which the product 40 is stored), the product 40 to be put into the box 130A or the box 130B by the worker at that location, and the type and number of each product 40 arranged on the display shelf.

The tablet computer 150 transmits the location information included in the replenishment instruction to the conveyor vehicle 110 (step S2A).

As a result, the replenishment assistance robot 100 moves to the second location such as the sales area (step S2B).

The conveyor vehicle 110 transmits the arrival notification to the tablet computer 150 (step S2C).

The tablet computer 150 transmits an instruction to the RFID reader 140 to read the RFID tag 41 of the product 40 on the display shelf at the second location such as the sales area (step S2D).

The RFID reader 140 reads the product ID information written on the RFID tag 41 on the product 40 of the display shelf through antennas 143A and 143B (step S2E). As a result, the type and number of products 40 on the display shelf can be read.

The RFID reader 140 transmits the product ID information read in step S2E and the information for identifying the RFID reader 140 to the tablet computer 150 (step S2F).

The tablet computer 150 calculates the type and number of insufficient products 40 at the display shelf based on the type and number of each product 40 arranged in the display shelf included in the replenishment instruction received in step S2 and the product ID information received in step S2F (step S2G). The tablet computer 150 transmits data indicating the type and number of the insufficient products 40 calculated based on the replenishment instruction to the management server 10.

The tablet computer 150 transmits the location information included in the replenishment instruction to the conveyor vehicle 110 (step S2H) to move the replenishment assistance robot 100 to the first location, such as the backyard.

As a result, the replenishment assistance robot 100 moves to the first location, such as the backyard (step S21). At this time, the tablet computer 150 causes the RFID reader 140 to read the RFID tag 41 in stock of the product 40 through the antennas 143A and 143B and moves the replenishment assistance robot 100 in front of the insufficient product 40 (the product 40 to be replenished).

The conveyor vehicle 110 transmits the arrival notification to the tablet computer 150 (step S2J). The replenishment assistance robot 100 waits in front of the product 40 to be replenished in this state.

The tablet computer 150 causes the alarm generator 180 to emit an alarm (step S2K) for alerting a salesclerk in the second location, such as the sales area, that the replenishment assistance robot 100 has moved to the first location, such as the backyard.

When the tablet computer 150 receives a notification from the controller of the conveyor vehicle 110 indicating that the replenishment assistance robot 100 has arrived at the first location in step S2J, the tablet computer 150 displays the type and number of the insufficient products 40 at the display shelf calculated in step 2G on the display (step S3). The worker can walk to the place where the replenishment assistance robot 100 is waiting and perform a work of putting the product 40 located at the first location, such as the backyard, into the boxes 130A and 130B while looking at the type and number of the products 40 displayed on the tablet computer 150 of the replenishment assistance robot 100.

The RFID reader 140 reads the product ID information written on the RFID tag 41 on each product 40 put into the box 130A or the box 130B by the worker (step S4). The RFID reader 140 reads the RFID tag 41 attached to the product 40 passing through the inlets 131A and 131B of the boxes 130A and 130B by using the antennas 142A and 142B. The process of step S4 allows the worker to obtain the product ID of the RFID tag 41 attached to the product 40 placed in the boxes 130A and 130B.

The RFID reader 140 transmits the product ID information read in step S4 and the information for identifying the RFID reader 140 to the tablet computer 150 (step S5).

The tablet computer 150 transmits the product ID information and the information for identifying the RFID reader 140 received in step S5 to the management server 10 (step S6).

The management server 10 counts the number of each product 40 included in the box 130A or the box 130B based on the product ID information received in step S6 (step S7). That is, the management server 10 performs the counting process of the products 40 included in the boxes 130A and 130B.

The management server 10 transmits the data of the replenishment status to the tablet computer 150 based on the number of each product 40 counted in step S7 (step S8). As described above, the replenishment status may include information on the number of products 40 already included in the box 130A or the box 130B.

The tablet computer 150 displays the replenishment status received in step S8 on the display (step S9). The worker can determine whether a product 40 should be further housed in the boxes 130A and 130B at the first location such as the backyard while looking at the replenishment status as described above.

The tablet computer 150 transmits the location information included in the replenishment instruction received in step S2 to the conveyor vehicle 110 (step S9A) when the completion operation is performed by the worker. The completion operation is an operation of tapping a completion button displayed on the display of the tablet computer 150 when the worker who looks at the display confirms that the desired number with respect to the insufficient products 40 has been put into the boxes 130A and 130B.

Accordingly, the replenishment assistance robot 100 moves to the second location, such as a sales area (step S2B). The boxes 130A and 130B of the replenishment assistance robot 100 which has returned to the second location, such as the sales area, contain the desired number of the insufficient products 40 at the display shelf. The salesclerk may remove the product 40 from the boxes 130A and 130B to arrange the product 40 on the display shelf during an interval in customer services.

<Functional block>

Figure 5:
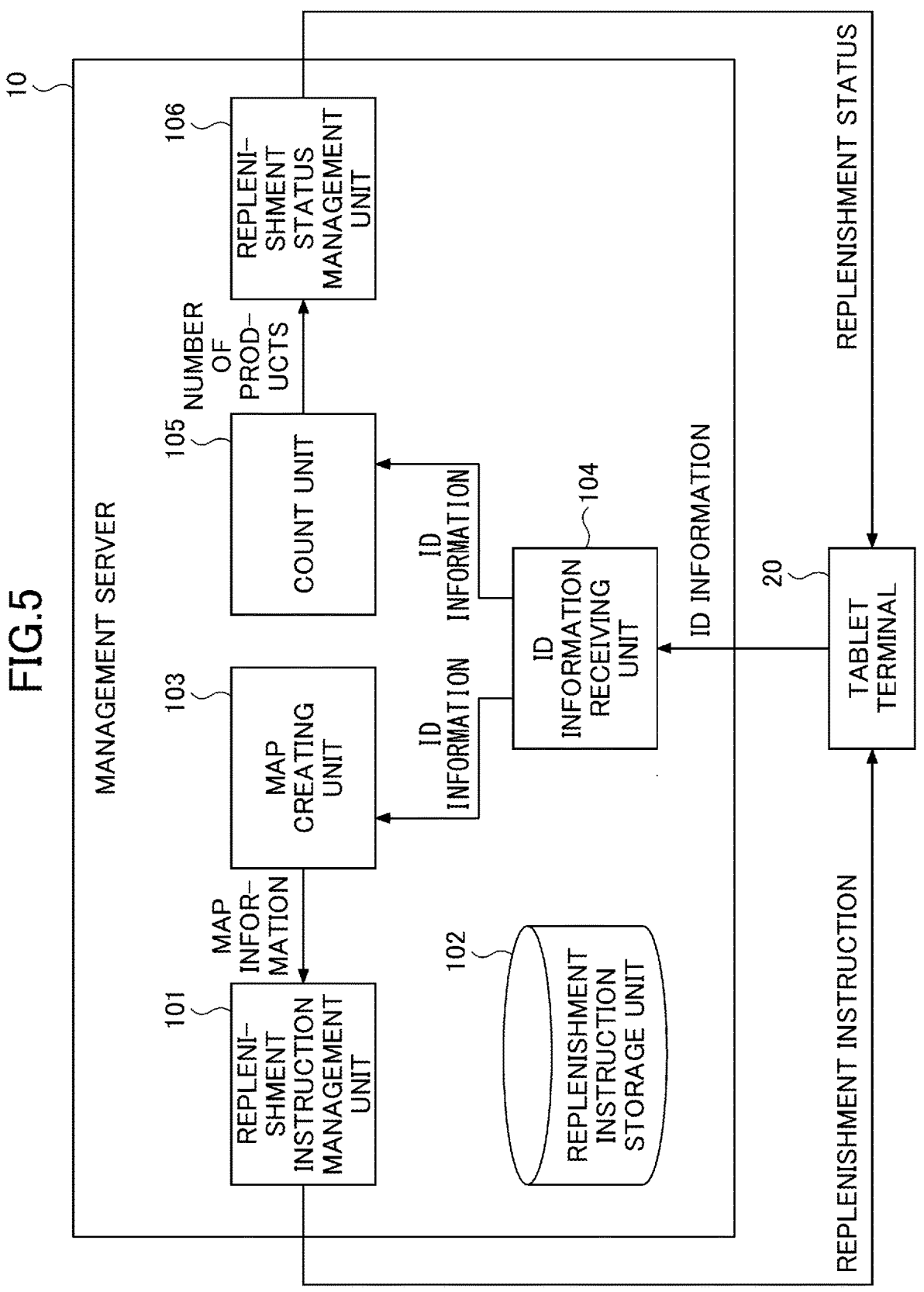
FIG. 5 is a functional block diagram of a management server 10.

FIG. 5 is a functional block diagram of the management server 10. As illustrated in FIG. 5, the management server 10 may include a replenishment instruction management unit 101, a replenishment instruction storage unit 102, a map creating unit 103, an ID information receiving unit 104, a count unit 105, and a replenishment status management unit 106. The management server 10 can function as the replenishment instruction management unit 101, the map creating unit 103, the ID information receiving unit 104, the count unit 105, and the replenishment status management unit 106 by executing a program. Each of them will be described below.

The tablet computer 150 may have a part of or all of the functions of the management server 10. For example, the tablet computer 150 may include a means for receiving a replenishment instruction (also referred to as a replenishment instruction receiving unit), the ID information receiving unit 104, the count unit 105, and the replenishment status management unit 106.

The replenishment instruction management unit 101 transmits the data of the replenishment instruction to the tablet computer 150. For example, in response to a worker tapping a screen for starting the replenishment operation displayed on the tablet computer 150, the replenishment instruction management unit 101 starts transmitting the data of the replenishment instruction. As described above, the replenishment instruction may include information of the location where the replenishment assistance robot 100 is to move (the location at which the product 40 is stored), the product 40 to be put into the box 130A or the box 130B by the worker at that location, and the type and number of each product 40 arranged on the display shelf. Further, the replenishment instruction management unit 101 stores the data of the replenishment instruction in the replenishment instruction storage unit 102.

The replenishment instruction storage unit 102 stores the data of the replenishment instruction transmitted to the tablet computer 150.

Hereinafter, a screen illustrating the replenishment instruction displayed on the tablet computer 150 will be described with reference to FIG. 6.

Figure 6:
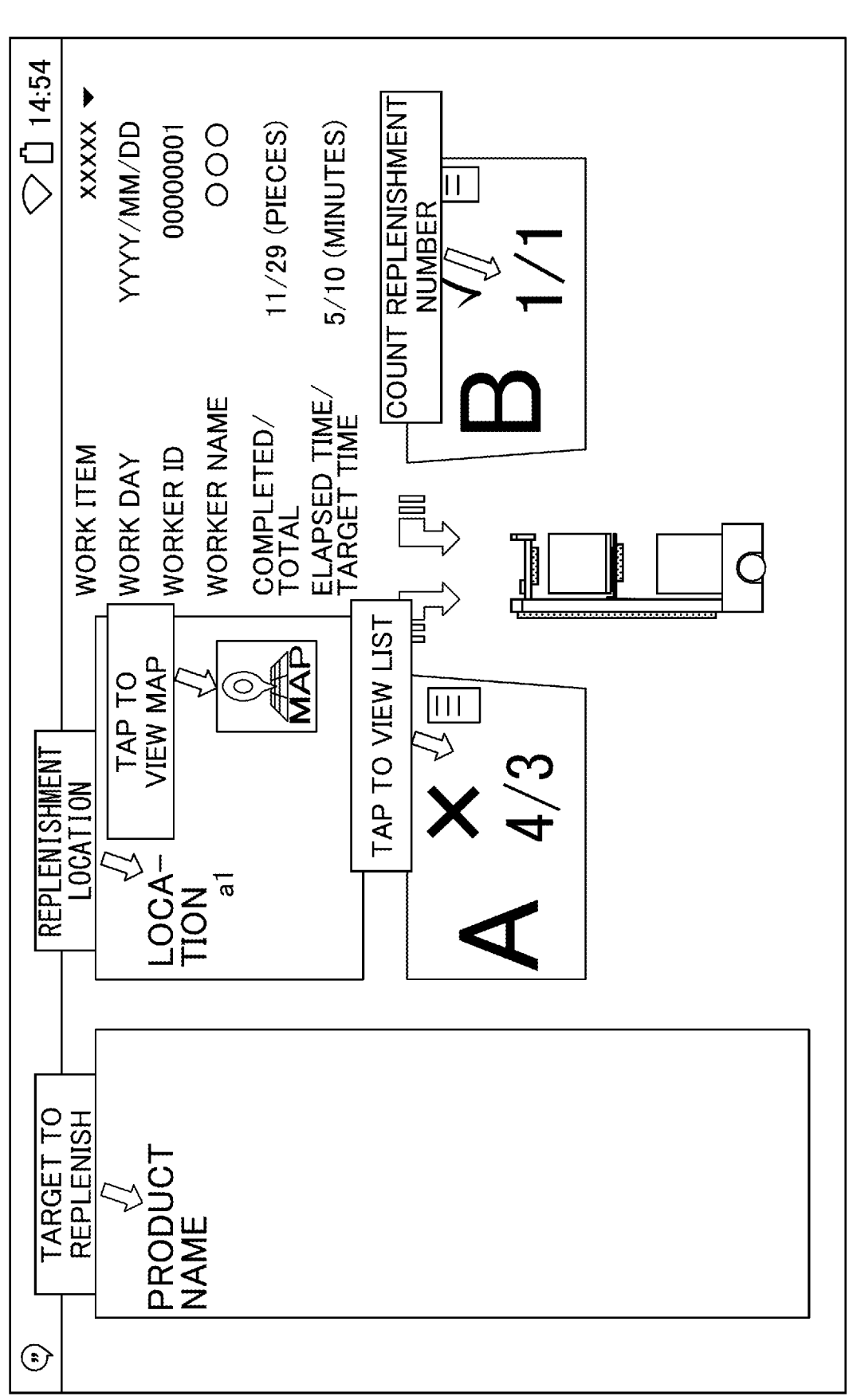
FIG. 6 is an example of a display screen of an embodiment.

FIG. 6 is an example of a display screen of the embodiment. As illustrated in FIG. 6, the location where the replenishment assistance robot 100 is to move (also referred to as the "replenishment location" or the location of shelves or the like at which the product 40 is stored) may be displayed. Further, as illustrated in FIG. 6, as the information indicating the type and number of the insufficient products 40 calculated based on the replenishment instruction, a name or an image of the product 40 to be put into the box 130A or the box 130B (to be picked) at that location by the worker (for example, an image of the product 40 when stored at the distribution center or the like) may be displayed. Further, as illustrated in FIG. 6, as the information indicating the type and number of the insufficient products 40 calculated based on the replenishment instruction, the number of the products 40 to be put into the box 130A or the box 130B by the worker (in the example of FIG. 6, the numbers to be put into the boxes 130A and 130B) may be displayed. Further, as illustrated in FIG. 6, the date on which the replenishment operation is performed (i.e., the work day), the identifier for the worker (i.e., the worker ID), the name of the worker (i.e., the worker name), the number of the total number of the products 40 to be acquired (i.e., the number of completed items/the total number of items), the elapsed time of the target time to complete acquiring (i.e., the elapsed time/the target time), and the like may be displayed. The worker can grasp how many products 40 are required to be acquired at which place by looking at the screen as illustrated in FIG. 6. When it is specified whether the product 40 should be put into the box 130A or the box 130B depending on the product 40, the worker can immediately grasp misplacement in the box 130A or the box 130B that is different from the instruction by looking at the screen as illustrated in FIG. 5.

With respect to each box 130A and 130B, a list representing one or more products 40 that the worker should put into the boxes 130A and 130B, and a list representing the number of each product 40 that the worker should put into the boxes 130A and 130B may be displayed. Hereinafter, a screen illustrating the information indicating the type and number of the insufficient products 40 calculated based on the replenishment instruction for each box 130A and 130B displayed on the tablet computer 150 will be described with reference to FIG. 6.

Figure 7:
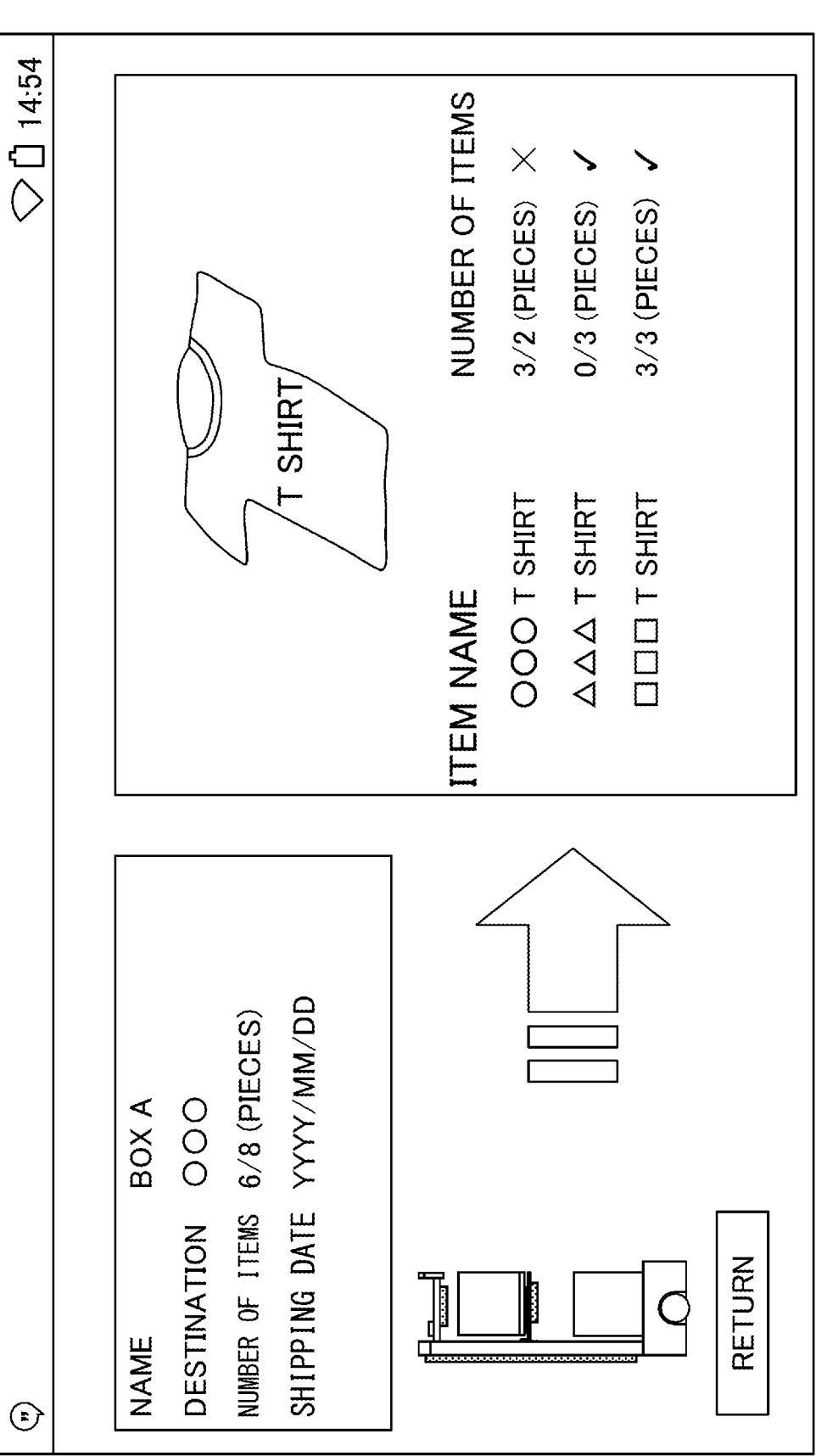
FIG. 7 is an example of a display screen of a tablet computer 150.

FIG. 7 is an example of a display screen of the tablet computer 150. As an example, FIG. 7 illustrates a display for the product 40 to be put into the box 130A. For example, when the screen of FIG. 6 is tapped, transition may be made to the screen of FIG. 7. As illustrated in FIG. 7, one or more products 40 to be put into the box 130A by the worker may be displayed. Further, as illustrated in FIG. 7, the number of each product 40 to be put into the box 130A by the worker may be displayed. Further, as illustrated in FIG. 7, the destination to which the product 40 is shipped (shipping destination), the total number of the products 40 to be put into the box 130A (number of items), date of shipment, or the like may be displayed. The worker can grasp how many products 40 are required to be acquired for each of the boxes 130A and 130B by looking at the screen as illustrated in FIG. 7.

Returning to FIG. 5, the ID information receiving unit 104 receives from the tablet computer 150 the product ID information read from the RFID tag 41 through the antennas 142A and 142B and the information for identifying the RFID reader 140. When the ID information receiving unit 104 receives the product ID information and the information for identifying the RFID reader 140, the ID information receiving unit 104 notifies the map creating unit 103 and the count unit 105.

The map creating unit 103 performs a map creation process. Specifically, the map creating unit 103 creates a map for guiding the replenishment assistance robot 100. Hereinafter, the map creation at the start of the replenishment operation and the map creation during the replenishment operation will be described separately.

<At Start of Replenishment Operation>

The map creating unit 103 generates a shortest distance route (path) through all the places where the product 40 instructed to be put into the box 130A or the box 130B at the first location, such as the backyard, is stored. This route is created for an area that includes both the first location, such as the backyard, and the second location, such as the sales area, but will now be described for a map of the first location, such as the backyard. The map creating unit 103 creates a map that clearly represents the generated route, the next replenishment location (that is, the replenishment location where the replenishment assistance robot 100 is to be directed next), and all of the replenishment locations on the layout diagram of the shelves in the backyard. The replenishment assistance robot 100 moves to each replenishment location according to the location information included in the replenishment instruction received from the management server 10 by the tablet computer 150 and the map created by the map creating unit 103.

<During Replenishment Operation>

The map creating unit 103 creates a map that clearly represents the route generated at the start of the replenishment operation, the next replenishment location (that is, the next replenishment location from the replenishment location where the replenishment has been completed), and all of the replenishment locations on the layout diagram of the shelves in the distribution center. The map creating unit 103 may regenerate a new route without using the route generated at the start of the replenishment operation.

If a plurality of replenishment assistance robots 100 are provided, both at the start of the replenishment operation and during the replenishment operation, the map creating unit 103 may generate a route so that the plurality of replenishment assistance robots 100 do not collide (for example, the plurality of replenishment assistance robots 100 do not go through the same path in the same direction or in the opposite direction simultaneously or within a predetermined time) based on the replenishment status of the plurality of replenishment assistance robots 100. Further, the present location or route (path) of the plurality of replenishment assistance robots 100 may be clearly represented on the map. The map creating unit 103 can generate a route (path) that avoids a shelf being crowded by other replenishment assistance robots 100.

Hereinafter, a screen illustrating a map displayed on the tablet computer 150 will be described with reference to FIG. 8.

Figure 8:
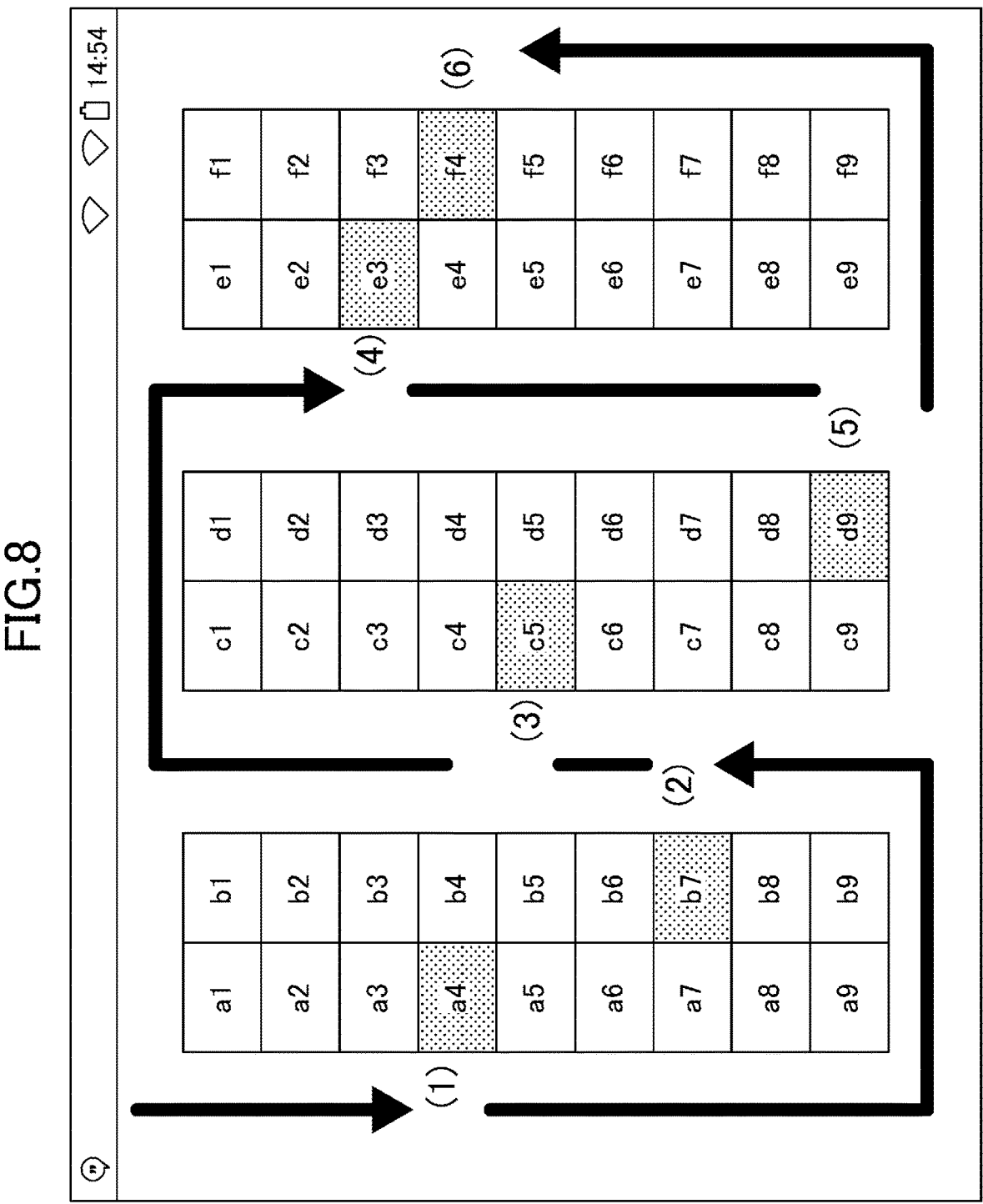
FIG. 8 is an example of a display screen of an embodiment.

FIG. 8 is an example of a display screen of the embodiment. Here, a map at the first location, such as the backyard, will be described. For example, when the screen of FIG. 6 is tapped, transition may be made to the screen of FIG. 8. As illustrated in FIG. 8, a map that clearly represents a route, a next replenishment location, and all replenishment locations may be displayed on the layout diagram of the shelves in the distribution center or the like.

Returning to FIG. 5, the count unit 105 performs a replenishment number counting process. Specifically, the count unit 105 identifies the number of each product 40 instructed to the worker to be put into the box 130A or the box 130B with reference to the type and number of the insufficient products 40 calculated based on the replenishment instruction. The count unit 105 counts the number of each product 40 stored in the box 130A or the box 130B based on the product ID information received from the ID information receiving unit 104. Specifically, when the count unit 105 receives the product ID information from the ID information receiving unit 104, the count unit 105 determines that the product 40 with the RFID tag 41 in which the product ID information is written is put into the box 130A or the box 130B. Further, the count unit 105 determines whether or not the number of each product 40 already in the box 130A or the box 130B is excessive or insufficient with respect to the number of each insufficient product 40 calculated on the basis of the replenishment instruction based on the instructed number and the counted number. Specifically, the count unit 105 determines that the product 40 is insufficient when the instructed number is larger than the counted number. The count unit 105 determines that the acquiring is completed when the instructed number is same as the counted number. The count unit 105 determines that the product 40 is excessive when the instructed number is smaller than the counted number.

The count unit 105 can determine whether the product 40 is stored in the box 130A or the box 130B based on the product ID information, the information for identifying the RFID reader 140, and information indicating whether the RFID reader 140 has read the product ID information with the antenna 142A or the antenna 142B.

The replenishment status management unit 106 transmits the replenishment status data to the tablet computer 150 based on the number of each product 40 counted by the count unit 105. As described above, the replenishment status may include information on the number of products 40 already in the box 130A or the box 130B. Hereinafter, a display of the replenishment status on the screen illustrating the replenishment instruction will be described with reference to FIG. 6 and FIG. 7.

As illustrated in FIG. 6, as the type and number of the insufficient products 40 calculated based on the replenishment instruction, the number of products 40 to be put into the box 130A or the box 130B by the worker may be displayed (see the denominator of the fractions). The number of products 40 already put into the box 130A or the box 130B by the worker (see the numerator of the fractions) may be displayed, together with the number of products 40 to be put into the box 130A or the box 130B. Further, whether or not the number already in the box 130A or the box 130B is excessive or insufficient with respect to the number of the insufficient products 40 is calculated based on the replenishment instruction. For example, the worker can easily recognize that the product 40 is insufficient, the replenishment is complete, or the product 40 is excessive. For example, when the product 40 is insufficient, no mark may be displayed, when the replenishment is complete, a check mark may be displayed, and when the product 40 is excessive, an "X" mark may be displayed.

As illustrated in FIG. 7, the number of one or more products 40 to be put into the box 130A by the worker may be displayed. The number of each product 40 already put into the box 130A or the box 130B by the worker may be displayed, together with the number of products 40 to be put into the box 130A or the box 130B. Further, whether or not the number already in the box 130A is excessive or insufficient with respect to the number of the insufficient products 40 calculated based on the replenishment instruction may be displayed. For example, the worker can easily recognize that the product 40 is insufficient, the replenishment is complete or the product 40 is excessive. For example, when the product 40 is insufficient, no mark may be displayed, when the replenishment is complete, a check mark may be displayed, and when the product 40 is excessive, an "X" mark may be displayed. It should be noted that such a display can be similarly displayed for the box 130B.

Figure 9:
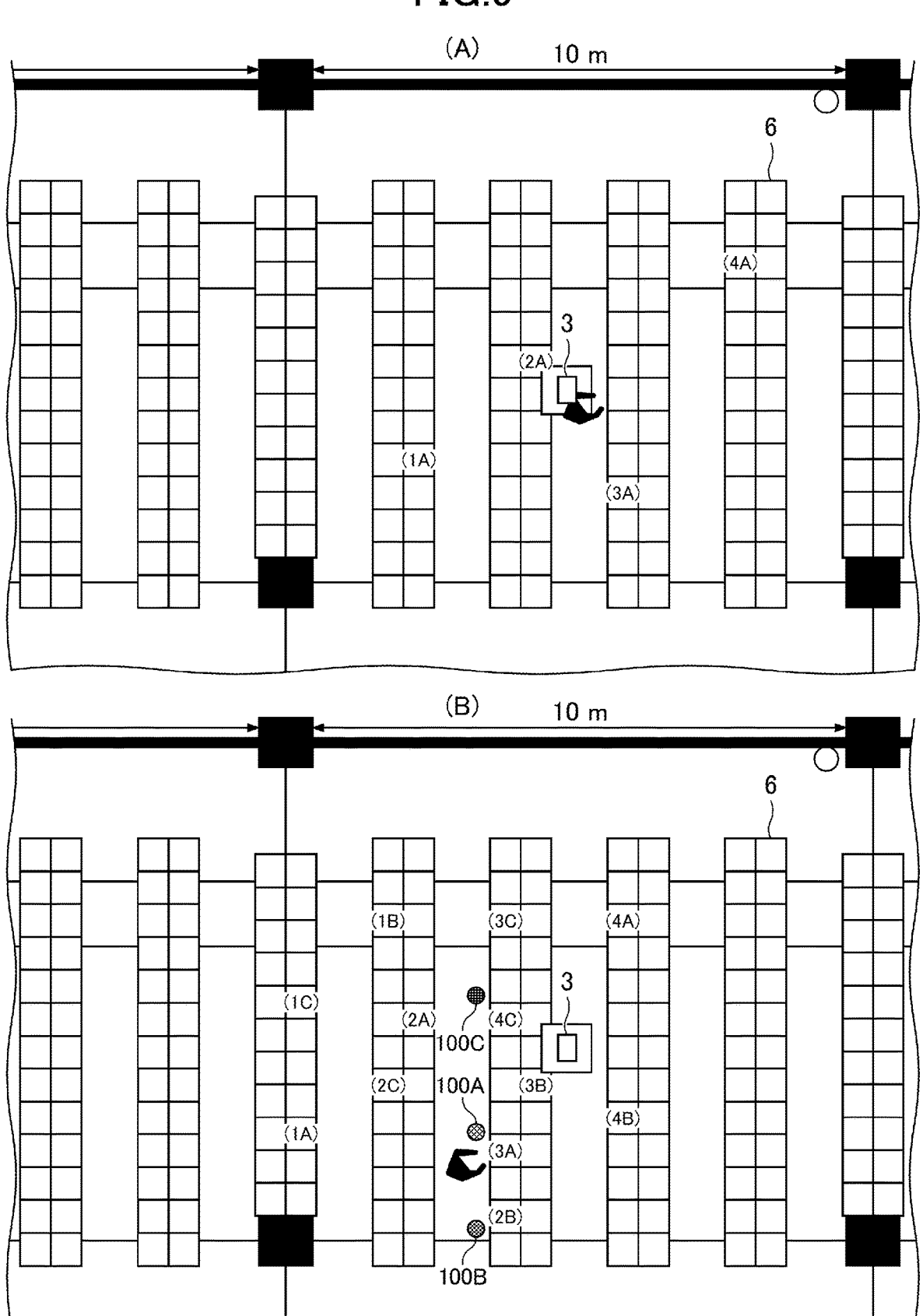
FIG. 9 is a diagram illustrating a work efficiency of the replenishment assistance robot 100.

FIG. 9 is a diagram illustrating a work efficiency of the replenishment assistance robot 100. Here, an operation at the first location, such as the backyard, will be described. For example, when acquiring of the products is performed using a hand-push type cart as illustrated in (A) of FIG. 9, the worker searches a shelf on which the products 40 of (1) to (4) are arranged while pushing the cart.

On the other hand, (B) of FIG. 9 illustrates how three replenishment assistance robots 100A to 100C are used to acquire products 40 of (1A) to (4A) with a replenishment assistance robot 100A, acquire products 40 of (1B) to (4B) with a replenishment assistance robot 100B, and acquire products 40 of (1C) to (4C) with a replenishment assistance robot 100C. The replenishment assistance robots 100A to 100C are the same as the replenishment assistance robot 100 illustrated in FIG. 1.

As an example, the replenishment assistance robots 100A to 100C are located on the same path. Since the replenishment assistance robots 100A to 100C are waiting in a location in front of the shelf represented by the location information included in the replenishment instruction, the worker may walk to the location of the replenishment assistance robots 100A to 100C and acquire products 40 included in the replenishment instruction while looking at the display of the tablet computer 150. Since the replenishment assistance robot (either 100A to 100C) for which the completion operation was performed automatically moves according to the following replenishment instruction and waits in front of the shelf, the worker may approach to the moved replenishment assistance robot (either 100A to 100C) and perform the replenishment operation. Therefore, if the replenishment assistance robot 100 is used, the efficiency of the acquiring operation can be significantly improved. In particular, if a plurality of replenishment assistance robots 100 are used, the work efficiency can be further improved.

Figure 10:
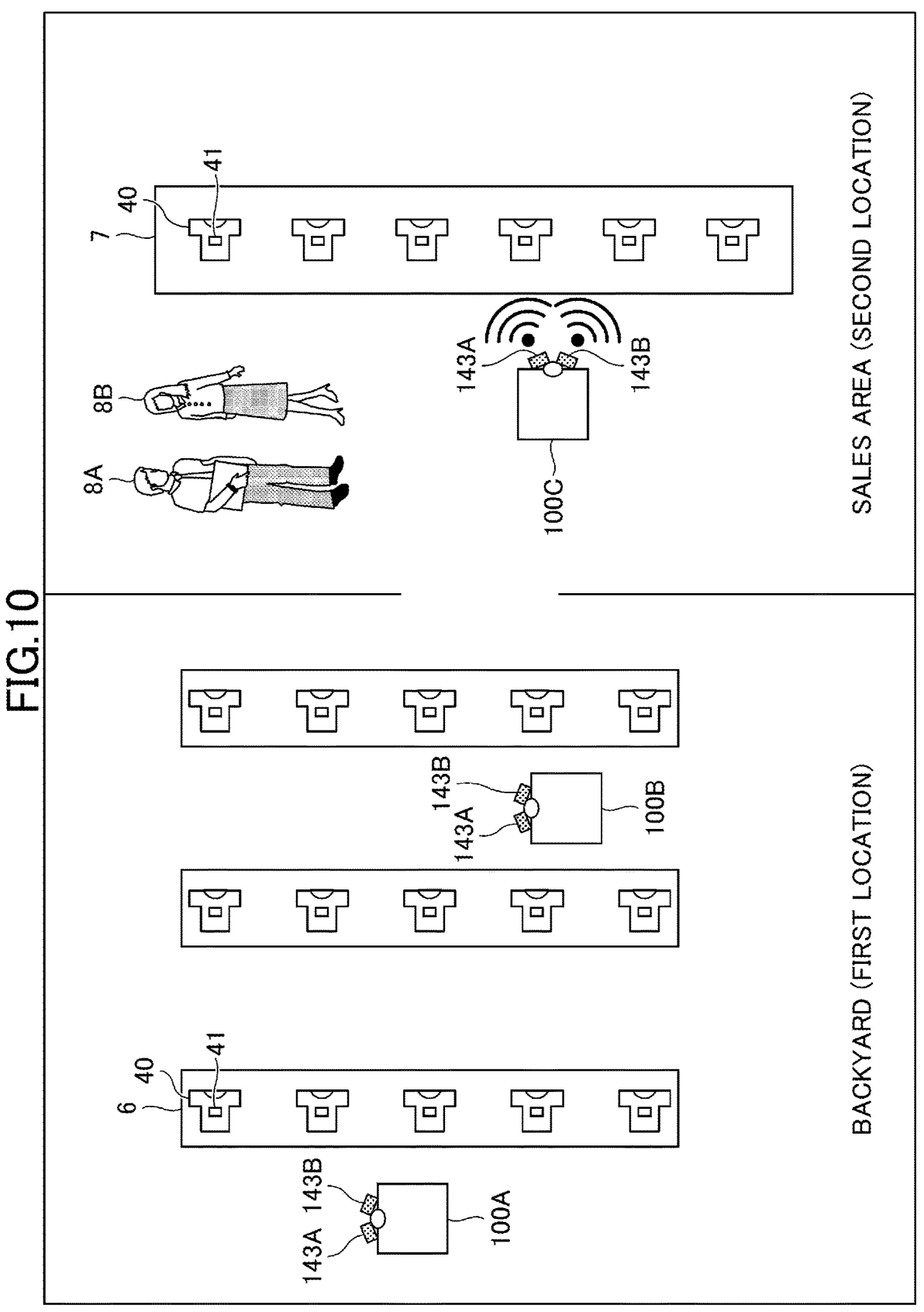
FIG. 10 is a diagram illustrating a work efficiency of the replenishment assistance robot 100.

FIG. 10 is a diagram illustrating a work efficiency of the replenishment assistance robot 100. FIG. 10 illustrates a backyard (one example of the first location) in the left half and a sales area (one example of the second location) in the right half. The stock of the product 40 is arranged on a shelf 6 of the backyard. Replenishment assistance robots 100A and 100B are waiting in front of the shelf 6 of the backyard. The product 40 is, by way of example, clothing.

At the sales area, a salesclerk 8A serves a customer 8B. Further, in the sales area, the type and number of products 40 displayed on a display shelf 7 are read by a replenishment assistance robot 100C through the antennas 143A and 143B. The replenishment assistance robot 100C automatically moves to the backyard according to the map upon completion of the reading, and reads the type and number of products 40 to be replenished through antennas 143A and 143B. The replenishment assistance robot 100 stops in front of the product 40 to be replenished, transmits an arrival notification to the management server 10, and emits an alarm.

Since the alarm is also heard on the sales area, the salesclerk 8A can recognize that the replenishment assistance robot 100C is waiting in the backyard even while serving the customer. The salesclerk 8A may walk to the replenishment assistance robot 100C at the backyard during an interval in customer services, to acquire the desired number of products displayed on the tablet computer 150 from the shelf 6 in front of the replenishment assistance robot 100C, and puts that product into the boxes 130A and 130B.

When the salesclerk 8A performs completion operation with respect to the tablet computer 150, the replenishment assistance robot 100C returns to the sales area and moves to wait in front of the shelf displaying the product 40 to be replenished. The salesclerk 8A can efficiently replenish the product 40 by taking out the product 40 from the boxes 130A and 130B and displaying that product on the display shelf 7 while serving the customer. This significantly improves the work efficiency.

Figure 11:
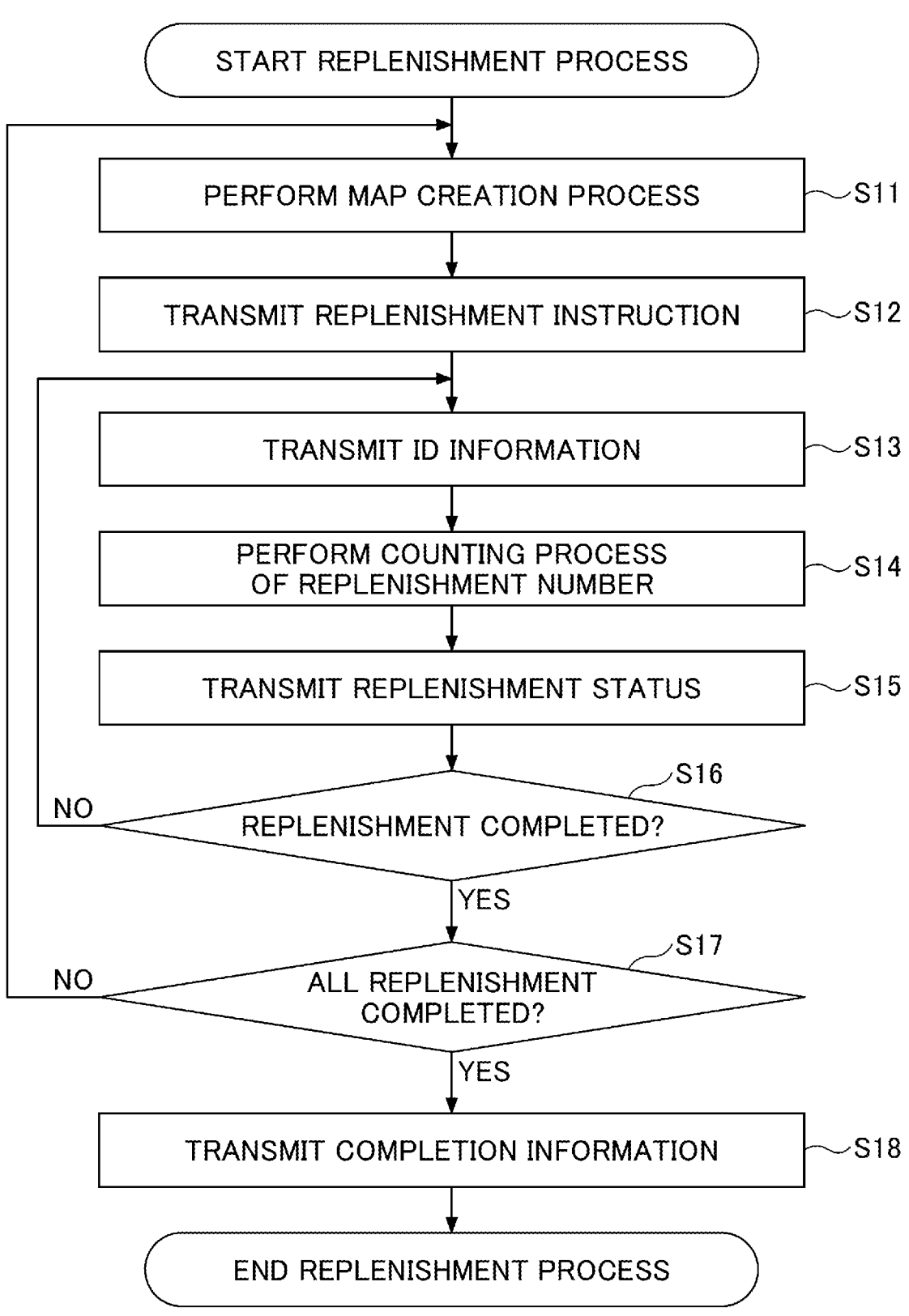
FIG. 11 is a flowchart of a replenishment process in the management server 10.

FIG. 11 is a flowchart of a replenishment process in the management server 10.

The map creating unit 103 performs the map creation process (step S11). At the start of the replenishment operation, the map creating unit 103 generates a shortest distance route (path) through all the places where the product 40 instructed to the worker to be put into the box 130A or the box 130B is stored. Next, the map creating unit 103 creates a map that clearly represents the generated route, the next replenishment location (that is, the replenishment location where the worker is to be directed toward first), and all of the replenishment locations on the layout diagram of the shelves in the distribution center.

The replenishment instruction management unit 101 transmits the data of the replenishment instruction to the tablet computer 150 (step S12). As described above, the replenishment instruction may include information on the location where the replenishment assistance robot 100 is to move (that is, the replenishment location where the replenishment assistance robot 100 is to move), the product 40 to be put into the box 130A or the box 130B by the worker at that location, and the type and number of each product 40 arranged on the display shelf.

The tablet computer 150 displays the type and number of the insufficient products 40 calculated based on the replenishment instruction transmitted by the replenishment instruction management unit 101 in S12 on the display. Further, the conveyor vehicle 110 moves to a predetermined location according to the location information included in the replenishment instruction. The worker may perform the acquiring operation while looking at the display of the tablet computer 150 of the replenishment assistance robot 100 moved to the predetermined location. The worker can switch from the screen indicating the type and number of the insufficient products 40 calculated based on the replenishment instruction to the map of S11.

The ID information receiving unit 104 receives the product ID information and the information for identifying the RFID reader 140 from the tablet computer 150 (step S13). Specifically, the ID information receiving unit 104 receives the product ID information written on the RFID tag 41 attached to each product 40 put into the box 130A or the box 130B by the worker.

The count unit 105 performs a replenishment number counting process based on the product ID information and the information for identifying the RFID reader 140 received in S13 (step S14). Details will be described with reference to FIG. 12.

The replenishment status management unit 106 transmits the replenishment status data to the tablet computer 150 based on the replenishment number counting process performed in S14 (step S15).

The replenishment status management unit 106 determines whether all of products 40 to be put into the box 130A or the box 130B at the current replenishment location are housed in the box 130A or the box 130B. If all of products 40 are housed, the process proceeds to step S17. If all of products 40 are not housed, the process returns to step S13.

Returning to step S13, the ID information receiving unit 104 waits for the product ID information from the tablet computer 150.

In step S17, the replenishment status management unit 106 determines whether all of products 40 to be put into the box 130A or the box 130B (that is, all of products 40 to be put into the box 130A or the box 130B at all replenishment locations) are housed in the box 130A or the box 130B (step S17). If all of products 40 are housed, the process proceeds to step S18. If all of products 40 are not housed, the process returns to step S11.

Returning to step S11, the map creating unit 103 creates a map in which the replenishment assistance robot 100 specifies the replenishment location to be directed next. Specifically, the map creating unit 103 creates a map that clearly represents the route generated at the start of replenishment (or newly regenerated route), the next replenishment location (that is, the replenishment location where the replenishment assistance robot 100 is to be directed toward the next), and all of the replenishment locations, and a location to be moved at the second location, such as the sales area, on the layout diagram of the shelves in the distribution center. Subsequently, in step S12, the replenishment instruction management unit 101 transmits the data of the replenishment instruction to the tablet computer 150. The replenishment instruction may include information on the location where the replenishment assistance robot 100 is to move (i.e., the replenishment location where the replenishment assistance robot 100 is to move next), the product 40 to be put into the box 130A or the box 130B by the worker at that location, and the type and number of each product 40 arranged on the display shelf.

In step S18, the replenishment status management unit 106 notifies the tablet computer 150 that the replenishment operation is completed (step S18).

FIG. 12 is a flowchart of the replenishment number counting process (S14 in FIG. 11).

The count unit 105 specifies the number of each product 40 instructed to the worker to be put into the box 130A or the box 130B with reference to the type and number of the insufficient products 40 calculated based on the replenishment instruction (step S21).

The count unit 105 counts the number of each product 40 housed in the boxes 130A and 130B based on the product ID information received from the ID information receiving unit 104 (step S22). Specifically, when the product ID information is received from the ID information receiving unit 104, the count unit 105 determines that the product 40 including the RFID tag 41 in which the product ID information is written is housed in the box 130A or the box 130B.

The count unit 105 determines whether or not the number of each product 40 already in the box 130A or the box 130B is excessive or insufficient with respect to the number of each product 40 instructed to the worker to be put into the box 130A or the box 130B based on the number specified in step S21 and the number counted in step S22 (step S23). Specifically, the count unit 105 determines that the product 40 is insufficient when the instructed number specified in step S21 is larger than the counted number in step S22. The count unit 105 determines that the replenishment is completed when the instructed number specified in step S21 is the same as the counted number in step S22. The count unit 105 determines that the product 40 is excessive when the instructed number specified in step S21 is smaller than the counted number in step S22.

FIG. 13 is a flowchart of a map creation process (S11 in FIG. 11) of the embodiment.

The map creating unit 103 generates a shortest distance route (path) through all the places where the product 40 instructed to the worker to be put into the box 130A or the box 130B is stored (step S31).

The map creating unit 103 specifies the next replenishment location (step S32).

The map creating unit 103 creates a map that clearly represents the route generated in S31, the next replenishment location specified in S32, all of the replenishment locations, and the location to be moved at the second location, such as the sales area, on the layout diagram of the shelves in the distribution center.

Figure 14:
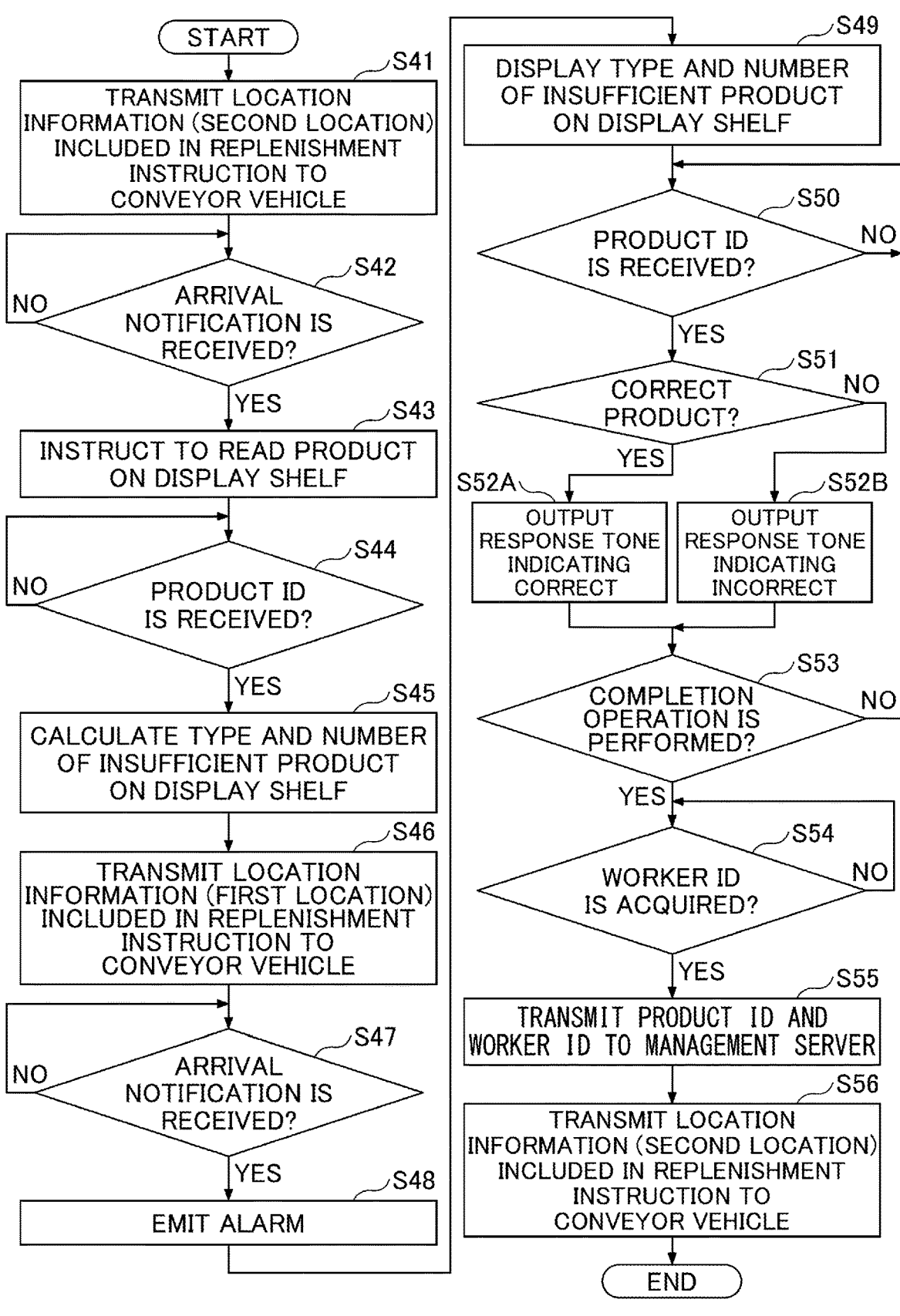
FIG. 14 is a flowchart of a process performed by a controller 151 of the tablet computer 150.

FIG. 14 is a flowchart of a process performed by a controller 151 of the tablet computer 150.

As a prerequisite, the tablet computer 150 is assumed to receive the replenishment instruction from the management server 10 and store the replenishment instruction in the memory.

The controller 151 transmits the location information related to the second location included in the replenishment instruction to the controller of the conveyor vehicle 110 (step S41). This causes the replenishment assistance robot 100 to move to the predetermined location represented by the location information. The second location, for example, is the sales area.

The controller 151 determines whether an arrival notification is received (step S42). When the arrival notification is determined to be not received, the controller 151 repeatedly executes the process in step S42.

When the controller 151 determines that the arrival notification has been received (S42: YES), the controller 151 instructs the RFID reader 140 to read the product 40 on the display shelf 7 (step S43). This allows the RFID reader 140 to read the RFID tag 41 of the product 40 through the antennas 143A and 143B. By this process, the number of products per 40 displayed on each position of the display shelf 7 can be known.

The controller 151 determines whether the product ID has been received (step S44). The process of step S44 is repeated until the product ID is received.

When the controller 151 determines that the product ID has been received (S44: YES), the controller 151 calculates the type and number of each insufficient product 40 on the display shelf (step S45). Step S45 corresponds to step S2G of FIG. 4.

The controller 151 transmits the location information related to the first location included in the replenishment instruction to the controller of the conveyor vehicle 110 and instructs the reading of the product 40 (step S46). The conveyor vehicle 110 is moved to the backyard based on the location information related to the first location included in the replenishment instruction, and the RFID tag 41 in stock of the product 40 in front of the replenishment assistance robot 100 is read by the antennas 143A and 143B. This is to determine whether the product 40 is to be replenished, and to move the replenishment assistance robot 100 to the front of the product 40 to be replenished.

The controller 151 determines whether the arrival notification is received (step S47). When it is determined that the arrival notification is not received, the controller 151 repeatedly executes the process in step S47.

When the controller 151 determines that the arrival notification is received (S47: YES), the alarm generator 180 emits an alarm (step S48). This allows to notify the sales-clerk 8A of the sales area that the replenishment assistance robot 100 has moved to the backyard and is waiting.

The controller 151 displays the type and number of each insufficient product 40 at the display shelf 7 (step S49).

The controller 151 determines whether the product ID information is received from the RFID reader 140 (step S50). When the product ID information is determined to be not received, the controller 151 repeatedly executes the process of step S50.

When the controller 151 determines that the product ID information is received (S50: YES), the controller 151 compares the received product ID information with the type of the product 40 included in the replenishment instruction to determine whether the product 40 is the correct product 40 to be replenished (step S45).

When the controller 151 determines that the product 40 is a correct product (S51: YES), the controller 151 outputs a response tone indicating that the product 40 is a correct product (step S52A).

When the controller 151 determines that the product 40 is not a correct product (S51: NO), the controller 151 outputs a response tone indicating that the product 40 is not the correct product. The response tone output in step S52B is different from the response tone output in step S52A. Therefore, the worker can check the determination result with the response tone.

The controller 151 determines whether a completion operation is performed (step S53). The completion operation is performed by operating the tablet computer 150 when the worker looks at the display of the tablet computer 150 and checks that all products 40 to be acquired have been acquired at that location. The completion operation is, for example, an operation of pressing the OK button. Further, the determination in step S53 is a process of determining whether the completion operation is performed within a predetermined time after the process in step S52A or step S52B is completed. The predetermined time is, for example, five seconds.

When the completion operation is determined to be performed (S53: YES), the controller 151 determines whether a face authentication is performed by the face authenticator 160 and the worker ID information is acquired (step S54). The controller 151 repeatedly performs the process in step S54 until the worker ID information is acquired.

When the worker ID information is determined to be acquired (S54: YES), the controller 151 transmits the product ID information related to the product 40 that is determined to be the correct product 40 in step S51 to the management server 10 in association with the worker ID information for identifying the worker that is authenticated in Step S54 (step S55). Since the product ID information related to the product 40 is associated with the worker ID information and transmitted to the management server 10, the amount of work and the work efficiency of each worker can be grasped in the management sever 10.

The controller 151 transmits location information related to the second location included in the replenishment instruction to the controller of the conveyor vehicle 110 (step S56). This causes the replenishment assistance robot 100 to move to the second location indicated by the location information, with the product 40 housed in the boxes 130A and 130B. The second location is, for example, the sales area. The sales-clerk SA can efficiently replenish the product 40 by taking out the product 40 from the boxes 130A and 130B and displaying that product on the display shelf 7 during an interval in customer services. Therefore, it is possible to efficiently replenish the product 40 to the display shelf 7.

When the process in step S56 is completed, the controller 151 ends a series of processes (END). The controller 151 repeatedly performs the processes illustrated in FIG. 14. When the controller 151 executes the process of step S41 again and reads the replenishment instruction, the replenishment assistance robot 100 moves to the next replenishment location, and in step S49, the type and number of each insufficient product 40 at the display shelf 7 is displayed on the display and the replenishment assistance robot 100 waits. Then, when the completion operation is performed in step S53 and the worker ID information is acquired by the face authenticator in step S54, the process returns to the sales area in step S56.

When the completion operation is determined to be not performed in step S53 (S53: NO), the controller 151 returns the flow to step S50. This is for receiving the product ID information related to another product 40 because the acquiring operation has not been completed.

Further, when NO is determined in the process of steps S42, S44, S47, S50, and S54 and the number of times repeating the process of steps S42, S44, S47, S50, and S54 reaches a predetermined number of times (for example, 5 times), the controller 151 may perform error processing. The error processing includes an output of the sound indicating an error and stopping the process illustrated in FIG. 14.

Effect

As described above, the worker can walk to the location where the replenishment assistance robot 100 is waiting and complete the acquiring operation at the first location by putting the product 40 into the box 130A or the box 130B while looking at the type and number of each insufficient product 40 displayed on the tablet computer 150. The product 40 acquired at the first location is a product 40 to be replenished on the display shelf at the second location. Accordingly, a replenishment assistance robot 100 and a replenishment assistance system 1 can be provided which can assist the worker in efficiently replenishing the product 40.

Further, since the antennas 142A and 142B of the RFID reader 140 can collectively read multiple RFID tags 41, the worker can efficiently and quickly perform the replenishment operation in a short time. In particular, when the number of products 40 of the same type is large, the collective reading greatly improves work efficiency. An example of such a product 40 is a drug such as a swallowing drug, an injection drug, or an external therapeutic drug, a mask, or other medical clothing or equipment.

Further, when the product 40 is put into the box 130A or the box 130B, it is possible to grasp whether the product 40 is a correct product 40 by the response tone. Therefore, the worker can accurately replenish the product 40 and improve the work efficiency.

Further, because the worker is authenticated by the face authenticator 160, the amount of work and the work efficiency for each worker can be grasped.

Further, because the replenishment assistance robot 100 waits in front of the shelf without moving until the completion operation is performed and the worker ID information is acquired by the face authentication, the replenishment assistance robot 100 can improve the work efficiency by moving according to the worker's intention.

Further, because the replenishment assistance robot 100 moves when the completed operation is performed and the worker ID information is acquired by the face authentication, the work efficiency can be improved by moving the robot according to the worker's intention.

Further, because the replenishment assistance robot 100 moves in front of the shelf or the like in which the product 40 is located according to the replenishment instruction with respect to the product 40 at a location different from the present location, the work efficiency can be improved by moving according to the worker's intention.

Further, the antennas 142A and 142B are located directly above the boxes 130A and 130B, respectively, so that the RFID tag of the product housed in the boxes 130A and 131B through the inlets 131A and 131B can be reliably read, even if the product has a metal package or the product contains a liquid. Further, an occurrence of the reading omission can be prevented.

Further, since the antennas 142A and 142B are provided at the inlets 131A and 131B of the boxes 130A and 130B, the product 40 for which the RFID tag 41 is read is put into the box 130A or the box 130B with certainty. Accordingly, it is not necessary to confirm that the product 40 is put into the box 130A or the box 130B, and the work efficiency can be improved. Further, by reading the RFID tag 41 from the upper side of the boxes 130A and 130B, the RFID tag 41 of the product 40 to be put into the box 130A or the box 130B is read even when a number of other products 40 are housed in the boxes 130A and 130B.

Further, as the shield 170 is provided between the box 130A and the antenna 142B, the antenna 142A can be prevented from reading the RFID tag attached to the product housed in the box 130B. In other words, the product 40 put into the box 130A or the box 130B can be accurately read by the antennas 142A and 142B, and a reading error can be prevented.

<Hardware Configuration>

Figure 15:
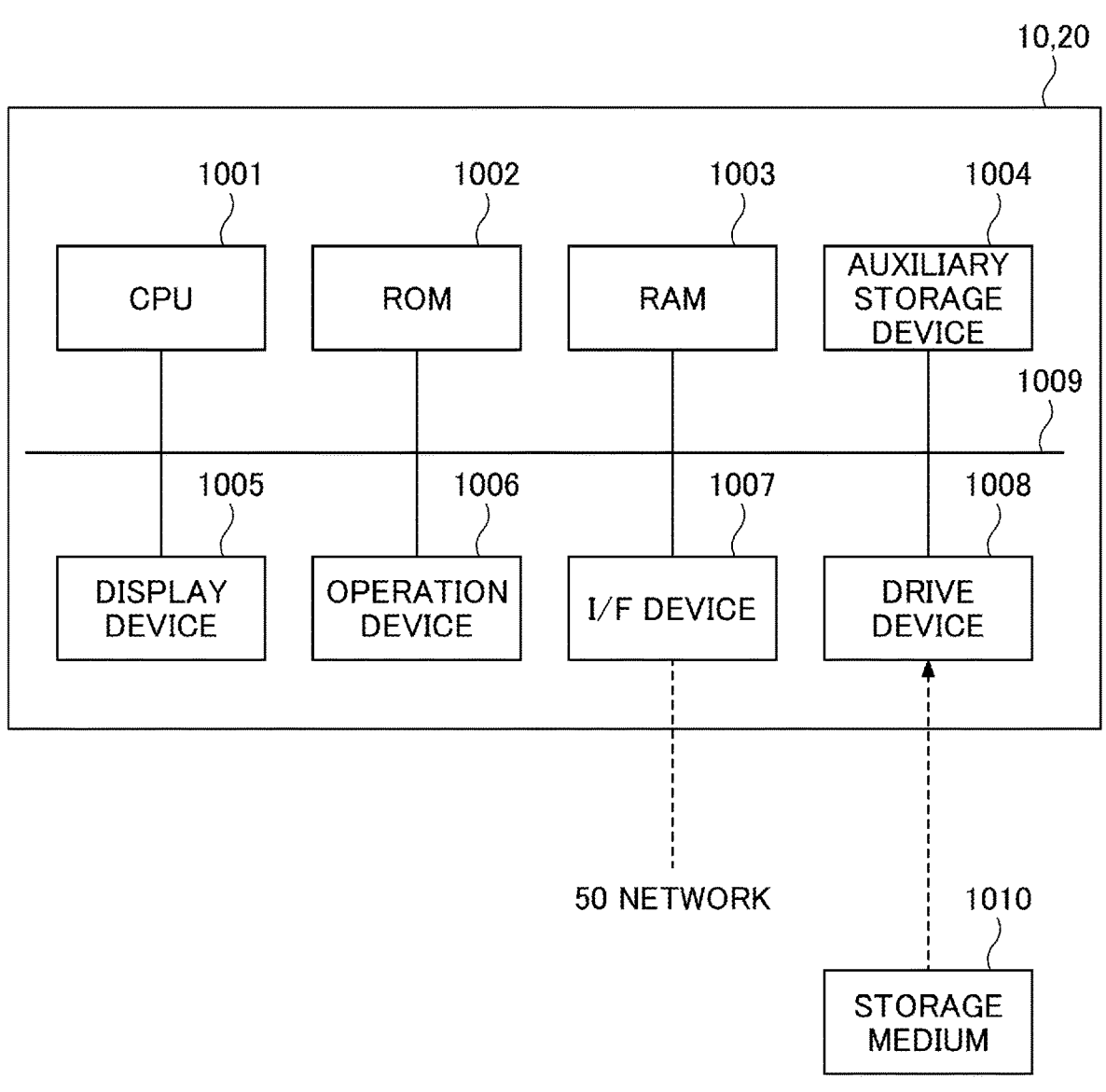
FIG. 15 is a diagram illustrating hardware configuration of the management server 10 and the tablet computer 150 according to an embodiment.

FIG. 15 is a diagram illustrating a hardware configuration of the management server 10 and the tablet computer 150 of the embodiment. The management server 10 and the tablet computer 150 include a Central Processing Unit (CPU) 1001, a Read Only Memory (ROM) 1002, and a Random Access Memory (RAM) 1003. The CPU 1001, the ROM 1002, and the RAM 1003 form a so-called computer.

The management server 10 and the tablet computer 150 include an auxiliary storage device 1004, a display device 1005, an operation device 1006, an interface (I/F) device 1007, and a drive device 1008. The hardware of the management server 10 and the tablet computer 150 is interconnected via the bus 1009.

The CPU 1001 is an arithmetic device that executes various programs installed in the auxiliary storage device 1004.

The ROM 1002 is a non-volatile memory. The ROM 1002 functions as a main storage device for storing various programs and data necessary for executing various programs installed in the auxiliary storage device 1004 by the CPU 1001. Specifically, the ROM 1002 functions as a main storage device for storing boot programs such as a Basic Input/Output System (BIOS) and an Extensible Firmware Interface (EFI).

The RAM 1003 is a volatile memory such as a Dynamic Random Access Memory (DRAM) or a Static Random Access Memory (SRAM). The RAM 1003 functions as a main storage device that provides a workspace deployed when various programs installed in the auxiliary storage device 1004 are executed by the CPU 1001.

The auxiliary storage device 1004 is an auxiliary storage device that stores various programs and information to be used when various programs are executed.

The display device 1005 is a display device for displaying the internal state or the like of the management server 10 and the tablet computer 150.

The operation device 1006 is an input device in which an administrator of the management server 10 and the tablet computer 150 inputs various instructions to the management server 10 and the tablet computer 150.

The I/F device 1007 is a communication device for connecting to the network 50 and communicating with the management server 10 and the tablet computer 150.

The drive device 1008 is a device for setting a storage medium 1010. Herein, the storage medium 1010 includes a medium that optically, electrically, or magnetically records information, such as a CD-ROM, a flexible disk, a magneto-optical disk, or the like. Further, the storage medium 1010 may also include a semiconductor memory or the like that electrically records information, such as an Erasable Programmable Read Only Memory (EPROM), a flash memory, or the like.

For example, various programs to be installed in the auxiliary storage device 1004 are installed when the distributed storage medium 1010 is set in the drive device 1008 and various programs recorded in the storage medium 1010 are read out by the drive device 1008. Alternatively, various programs to be installed in the auxiliary storage device 1004 may be installed by being downloaded from another network different from the network 50 via the I/F device 1007.

Although the replenishment assistance robot and the replenishment assistance system 1 of the exemplary embodiment of the present disclosure have been described above, the present disclosure is not limited to specifically disclosed embodiments, and various modifications and variations can be made without departing from the scope of the claims.

This international application claims priority based on the Japanese patent application 2020-143906 filed on Aug. 27, 2020, the entire contents of which are incorporated herein by reference.

DESCRIPTION OF THE REFERENCE
NUMERALS

1 replenishment assistance system
10 management server
40 product
41 RFID tag
50 network
100, 100A, 100B, 100C replenishment assistance robot
101 replenishment instruction management unit
102 replenishment instruction storage unit
103 map creating unit
104 ID information receiving unit
105 count unit
106 replenishment status management unit
110 conveyor vehicle
120 frame
130A, 130B box
140 RFID reader
141 main body
142A, 142B, 143A, 143B antenna
150 tablet computer
160 face authenticator
170 shield
1001 CPU
1002 ROM
1003 RAM
1004 auxiliary storage device
1005 display device
1006 operation device
1007 I/F device
1008 drive device
1009 bus
1010 storage medium

What is claimed is:

1. A replenishment assistance robot comprising:
a plurality of housings, each of the plurality of housings configured to house a product, each of the plurality of housings having an inlet located at a top thereof:
an RFID reader including a first antenna and a plurality of second antennas, the first antenna configured to read an RFID tag attached to a product on a shelf and each of the plurality of second antennas configured to read an RFID tag of a product housed in each of the plurality of housings:
a terminal configured to receive a replenishment instruction of the product on the shelf;
a mobile body containing the plurality of housings and the RFID reader, the mobile body configured to move to a location where a stock of the product is arranged based on location information of the product included in the replenishment instruction; and
a shield configured to block reading of the RFID tag, wherein
the first antenna is disposed on a front or a side of the mobile body,
each of the plurality of second antennas is disposed above the inlet of each of the plurality of housings in a state in which each of the plurality of second antennas reads the RFID tag while the product is housed in each of the plurality of housings, and
the shield is disposed between the plurality of housings such that regions capable of being read by the plurality of second antennas are not overlapped.

2. The replenishment assistance robot according to claim 1, wherein the terminal, upon recognizing that the RFID tag is read by the RFID reader when the product is housed in each of the plurality of housings, outputs a response tone indicating that the RFID tag is recognized or displays a response indication indicating that the RFID tag is recognized.

3. The replenishment assistance robot according to claim 2, further comprising an authenticator that performs an authentication of a worker when the terminal recognizes that the RFID tag is read by the RFID reader when the product is housed in each of the plurality of housings.

4. The replenishment assistance robot according to claim 1, wherein the mobile body waits without moving until an operation representing completion of work with respect to the terminal is performed by a worker, after the RFID tag is read by the RFID reader when the product is housed in each of the plurality of housings.

5. The replenishment assistance robot according to claim 1, wherein the mobile body moves to a location, based on location information included in a moving instruction, when an operation representing completion of work with respect to the terminal is performed by a worker after the RFID tag is read by the RFID reader when the product is housed in the each of the plurality of housings.

6. The replenishment assistance robot according to claim 5, wherein the moving instruction is an instruction to move from a first location where an operation for putting the product into the each of the plurality of housings is performed to a second location where an operation of taking out the product housed in the each of the plurality of housings is performed, and
wherein the mobile body moves to the second location based on location information included in the moving instruction.

7. The replenishment assistance robot according to claim 6, wherein the second location is a location where the shelf is located, and the shelf is a display shelf.

8. The replenishment assistance robot according to claim 1, further including an alarm generator for emitting an alarm, wherein the terminal causes the alarm generator to emit an alarm when the mobile body moves to a location where a stock of the product is arranged.

9. A replenishment assistance system that includes a server and the replenishment assistance robot as claimed in claim 1, the replenishment assistance system comprising:

a replenishment instruction management unit configured to transmit a replenishment instruction:

an ID information receiving unit configured to receive ID information written on the RFID tag attached to the product read by the RFID reader;

a count unit configured to count a number of products housed in each of the plurality of housings based on the ID information; and a replenishment status management unit configured to transmit a replenishment status based on the number of the counted products.

10. The replenishment assistance system according to claim 9, wherein the count unit determines whether or not the number housed in each of the plurality of housings is excessive or insufficient with respect to an insufficient number at the shelf calculated based on the replenishment instruction, and the replenishment status management unit displays on a terminal one message, from among the following: a product is insufficient, replenishment is completed, and a product is excessive.

\*  \*  \*  \*  \*